U S 012542289B2
US012542289B2

(12) United States Patent
Ahmad et al.

(10) Patent No.: US 12,542,289 B2
(45) Date of Patent: Feb. 3, 2026

(54) HANDLING OF VARIABLE AND UNPREDICTABLE GAS COMPOSITION CHANGES TO MAXIMIZE HEALTH AND PERFORMANCE OF FUEL CELL SYSTEMS

(71) Applicant: BLOOM ENERGY CORPORATION, San Jose, CA (US)

(72) Inventors: Zeerek A. Ahmad, Foster City, WA (US); Adrian Ong, San Ramon, CA (US); Suthitham Kusolasak, Santa Clara, CA (US); Ali Zargari, Santa Clara, CA (US); Jeffrey Crim Carlson, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 81 days.

(21) Appl. No.: 17/807,986

(22) Filed: Jun. 21, 2022

(65) Prior Publication Data

US 2022/0416276 A1    Dec. 29, 2022

Related U.S. Application Data

(60) Provisional application No. 63/236,923, filed on Aug. 25, 2021, provisional application No. 63/215,220, filed on Jun. 25, 2021.

(51) Int. Cl.
*H01M 8/04746* (2016.01)
*H01M 8/0438* (2016.01)
(Continued)

(52) U.S. Cl.
CPC ... *H01M 8/04753* (2013.01); *H01M 8/04447* (2013.01)

(58) Field of Classification Search
CPC ......... H01M 8/04753; H01M 8/04447; H01M 8/04298; H01M 8/04619;
(Continued)

(56) References Cited

U.S. PATENT DOCUMENTS 3,453,087 A    7/1969    Herp, Jr. et al.
3,453,146 A    7/1969    Bawa et al.
(Continued)

FOREIGN PATENT DOCUMENTS

DE    4005468 A1    8/1991
DE    19924777 A1    11/2000
(Continued)

OTHER PUBLICATIONS

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.
(Continued)

*Primary Examiner* — Christian Roldan
(74) *Attorney, Agent, or Firm* — THE MARBURY LAW GROUP PLLC

(57) ABSTRACT

A disclosed fuel cell system includes a fuel inlet that receives a fuel gas from a fuel source, a gas analyzer that determines a composition of the fuel gas received by the fuel inlet, and a stack including fuel cells that generate electricity using the fuel gas received from the fuel source. The fuel cell system further includes a controller that controls at least one of a fuel utilization of the stack, a current generated by the stack, or a voltage generated by the stack, based on the composition of the primary fuel gas determined by the gas analyzer. The controller may control the fuel cell system by increasing or decreasing a fuel flow rate to thereby increase or decrease the voltage generated by the stack to maintain a
(Continued)

predetermined target voltage or to maintain a predetermined rate at which usable fuel is supplied to the stack based on composition.

11 Claims, 12 Drawing Sheets

(51) Int. Cl.
    *H01M 8/0444* (2016.01)
    *H01M 8/04537* (2016.01)
(58) Field of Classification Search
    CPC ..... H01M 2008/1293; H01M 2250/20; H01M 8/0438; H01M 8/04388; H01M 8/04425; H01M 8/04097; H01M 8/04462; H01M 8/04559; H01M 8/04589; H01M 8/04776; H01M 8/04798; H01M 8/0488; H01M 8/0491; H01M 8/04992; H01M 8/0662; H01M 8/249; H01M 8/04089; H01M 8/0618; Y02E 60/50; G01N 33/0036
    USPC .......................................................... 429/444
    See application file for complete search history.

(56) References Cited

U.S. PATENT DOCUMENTS

| | | |
|---|---|---|
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | McCallister |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,647,516 A | 3/1987 | Matsumura et al. |
| 4,654,207 A | 3/1987 | Preston |
| 4,657,829 A | 4/1987 | McElroy et al. |
| 4,670,359 A | 6/1987 | Beshty et al. |
| 4,678,723 A | 7/1987 | Wertheim |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,865,926 A | 9/1989 | Levy et al. |
| 4,898,792 A | 2/1990 | Singh et al. |
| 4,904,548 A | 2/1990 | Tajima |
| 4,917,971 A | 4/1990 | Farooque |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,362 A | 1/1992 | Farooque |
| 5,084,363 A | 1/1992 | Reiser |
| 5,084,632 A | 1/1992 | Farooque |
| 5,091,075 A | 2/1992 | O'Neill et al. |
| 5,100,743 A | 3/1992 | Narita et al. |
| 5,143,800 A | 9/1992 | George et al. |
| 5,169,730 A | 12/1992 | Reichner et al. |
| 5,170,124 A | 12/1992 | Blair et al. |
| 5,175,062 A | 12/1992 | Farooque et al. |
| 5,187,024 A | 2/1993 | Matsumura |
| 5,212,022 A | 5/1993 | Takahashi et al. |
| 5,227,256 A | 7/1993 | Marianowski et al. |
| 5,232,792 A | 8/1993 | Reznikov |
| 5,246,791 A | 9/1993 | Fisher et al. |
| 5,270,127 A | 12/1993 | Koga et al. |
| 5,302,470 A | 4/1994 | Okada et al. |
| 5,324,452 A | 6/1994 | Allam et al. |
| 5,328,779 A | 7/1994 | Tannenberger et al. |
| 5,340,664 A | 8/1994 | Hartvigsen |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | McElroy |
| 5,516,344 A | 5/1996 | Corrigan |
| 5,527,631 A | 6/1996 | Singh et al. |
| 5,573,867 A | 11/1996 | Zafred et al. |
| 5,601,937 A | 2/1997 | Isenberg |
| 5,641,585 A | 6/1997 | Lessing et al. |
| 5,686,196 A | 11/1997 | Singh et al. |
| 5,693,201 A | 12/1997 | Hsu et al. |
| 5,733,675 A | 3/1998 | Dederer et al. |
| 5,741,605 A | 4/1998 | Gillett et al. |
| 5,763,114 A | 6/1998 | Khandkar et al. |
| 5,955,039 A | 9/1999 | Dowdy |
| 6,013,385 A | 1/2000 | DuBose |
| 6,051,125 A | 4/2000 | Pham et al. |
| 6,106,964 A | 8/2000 | Voss et al. |
| 6,106,967 A | 8/2000 | Virkar et al. |
| 6,126,908 A | 10/2000 | Clawson et al. |
| 6,232,005 B1 | 5/2001 | Pettit |
| 6,280,865 B1 | 8/2001 | Eisman et al. |
| 6,309,770 B1 | 10/2001 | Nagayasu et al. |
| 6,329,090 B1 | 12/2001 | McElroy et al. |
| 6,348,278 B1 | 2/2002 | Lapierre et al. |
| 6,376,111 B1 | 4/2002 | Mathias et al. |
| 6,383,670 B1 | 5/2002 | Edlund et al. |
| 6,403,245 B1 | 6/2002 | Hunt |
| 6,436,562 B1 | 8/2002 | DuBose |
| 6,451,466 B1 | 9/2002 | Grasso et al. |
| 6,492,050 B1 | 12/2002 | Sammes |
| 6,531,243 B2 | 3/2003 | Thom |
| 6,582,842 B1 | 6/2003 | King |
| 6,623,880 B1 | 9/2003 | Geisbrecht et al. |

(56) References Cited

U.S. PATENT DOCUMENTS

| | | | |
|---|---|---|---|
| 6,649,291 B1* | 11/2003 | Iijima | H01M 8/0625 |
| | | | 180/65.21 |
| 6,655,150 B1 | 12/2003 | Asen et al. | |
| 6,656,625 B1 | 12/2003 | Thompson et al. | |
| 6,749,958 B2 | 6/2004 | Pastula et al. | |
| 6,821,663 B2 | 11/2004 | McElroy | |
| 6,880,628 B2 | 4/2005 | Yoshida et al. | |
| 6,890,671 B2* | 5/2005 | Roche | H01M 8/04089 |
| | | | 429/432 |
| 6,924,053 B2 | 8/2005 | McElroy | |
| 7,067,208 B2 | 6/2006 | Gottmann et al. | |
| 7,452,619 B2 | 11/2008 | Ahmed | |
| 7,659,022 B2 | 2/2010 | Valensa et al. | |
| 7,704,617 B2 | 4/2010 | Venkataraman | |
| 7,705,490 B2 | 4/2010 | Srinivasan et al. | |
| 7,713,649 B2 | 5/2010 | Hickey et al. | |
| 7,736,774 B2 | 6/2010 | Ogiwara et al. | |
| 7,974,106 B2 | 7/2011 | Gurunathan et al. | |
| 8,057,944 B2 | 11/2011 | Venkataraman | |
| 8,062,802 B2 | 11/2011 | Devriendt | |
| 8,101,307 B2 | 1/2012 | McElroy et al. | |
| 8,137,855 B2 | 3/2012 | Weingaertner et al. | |
| 8,288,041 B2 | 10/2012 | Perry et al. | |
| 8,920,997 B2 | 12/2014 | Venkataraman | |
| 8,968,943 B2 | 3/2015 | Perry et al. | |
| 9,287,572 B2 | 3/2016 | Weingaertner et al. | |
| 2001/0009653 A1 | 7/2001 | Clawson et al. | |
| 2001/0049035 A1 | 12/2001 | Haltiner, Jr. et al. | |
| 2002/0004154 A1 | 1/2002 | Pastula et al. | |
| 2002/0015867 A1 | 2/2002 | Cargnelli et al. | |
| 2002/0028362 A1 | 3/2002 | Prediger et al. | |
| 2002/0058175 A1 | 5/2002 | Ruhl | |
| 2002/0106544 A1 | 8/2002 | Noetzel et al. | |
| 2002/0142198 A1 | 10/2002 | Towler et al. | |
| 2002/0142208 A1 | 10/2002 | Keefer et al. | |
| 2002/0192516 A1 | 12/2002 | Tajima | |
| 2003/0021741 A1 | 1/2003 | Childress et al. | |
| 2003/0031904 A1 | 2/2003 | Haltiner | |
| 2003/0049502 A1 | 3/2003 | Dickman et al. | |
| 2003/0143448 A1 | 7/2003 | Keefer | |
| 2003/0157386 A1 | 8/2003 | Gottmann | |
| 2003/0162067 A1 | 8/2003 | McElroy | |
| 2003/0196893 A1 | 10/2003 | McElroy | |
| 2003/0205641 A1 | 11/2003 | McElroy | |
| 2003/0224231 A1 | 12/2003 | Penev | |
| 2003/0235725 A1 | 12/2003 | Haltiner et al. | |
| 2004/0018144 A1 | 1/2004 | Briscoe | |
| 2004/0023088 A1 | 2/2004 | Ozeki et al. | |
| 2004/0089438 A1 | 5/2004 | Valensa et al. | |
| 2004/0096713 A1 | 5/2004 | Ballantine et al. | |
| 2004/0121201 A1 | 6/2004 | Roche et al. | |
| 2004/0131912 A1 | 7/2004 | Keefer et al. | |
| 2004/0142215 A1 | 7/2004 | Barbir et al. | |
| 2004/0191597 A1 | 9/2004 | McElroy | |
| 2004/0191598 A1 | 9/2004 | McElroy | |
| 2004/0202914 A1 | 10/2004 | Sridhar et al. | |
| 2004/0217732 A1 | 11/2004 | Zhu et al. | |
| 2004/0224193 A1 | 11/2004 | Mitlitsky et al. | |
| 2004/0258587 A1 | 12/2004 | Bowe et al. | |
| 2005/0048334 A1 | 3/2005 | Sridhar et al. | |
| 2005/0048336 A1 | 3/2005 | Takebe et al. | |
| 2005/0048338 A1 | 3/2005 | Kobayashi et al. | |
| 2005/0053814 A1 | 3/2005 | Imamura et al. | |
| 2005/0056412 A1 | 3/2005 | Reinke et al. | |
| 2005/0106429 A1 | 5/2005 | Keefer | |
| 2005/0164051 A1 | 7/2005 | Venkataraman et al. | |
| 2005/0204628 A1 | 9/2005 | Deshpande | |
| 2005/0249988 A1 | 11/2005 | Pearson | |
| 2006/0046112 A1 | 3/2006 | Isozaki et al. | |
| 2006/0083964 A1 | 4/2006 | Edlinger et al. | |
| 2006/0147771 A1 | 7/2006 | Russell et al. | |
| 2006/0248799 A1 | 11/2006 | Bandhauer et al. | |
| 2006/0251934 A1 | 11/2006 | Valensa et al. | |
| 2006/0251939 A1 | 11/2006 | Bandhauer et al. | |
| 2006/0251940 A1 | 11/2006 | Bandhauer et al. | |
| 2007/0017367 A1 | 1/2007 | McElroy et al. | |
| 2007/0017368 A1 | 1/2007 | Levan et al. | |
| 2007/0017369 A1 | 1/2007 | Levan et al. | |
| 2007/0111053 A1 | 5/2007 | Penev et al. | |
| 2007/0178338 A1 | 8/2007 | McElroy et al. | |
| 2007/0196704 A1 | 8/2007 | Valensa | |
| 2007/0231628 A1 | 10/2007 | Lyle et al. | |
| 2007/0231635 A1 | 10/2007 | Venkataraman et al. | |
| 2007/0243435 A1 | 10/2007 | Dutta | |
| 2007/0269693 A1 | 11/2007 | Perry | |
| 2008/0038600 A1 | 2/2008 | Valensa et al. | |
| 2008/0050632 A1 | 2/2008 | Salter et al. | |
| 2008/0057359 A1 | 3/2008 | Venkataraman et al. | |
| 2008/0197190 A1 | 8/2008 | Fujita | |
| 2009/0029204 A1 | 1/2009 | Venkataraman et al. | |
| 2009/0029205 A1 | 1/2009 | Venkataraman et al. | |
| 2009/0042068 A1 | 2/2009 | Weingaertner | |
| 2009/0208784 A1 | 8/2009 | Perry et al. | |
| 2010/0009221 A1 | 1/2010 | Ballantine et al. | |
| 2010/0119888 A1 | 5/2010 | Song et al. | |
| 2010/0203416 A1 | 8/2010 | Venkataraman | |
| 2010/0239924 A1 | 9/2010 | McElroy et al. | |
| 2011/0053027 A1 | 3/2011 | Weingaertner | |
| 2011/0281185 A1 | 11/2011 | Sridhar et al. | |
| 2012/0178003 A1 | 7/2012 | Venkataraman | |
| 2012/0196194 A1 | 8/2012 | Perry et al. | |
| 2012/0196195 A1 | 8/2012 | Perry et al. | |
| 2012/0202130 A1 | 8/2012 | Weingaertner et al. | |
| 2012/0270117 A9 | 10/2012 | Venkataraman et al. | |
| 2012/0282534 A1* | 11/2012 | Braun | H01M 8/04201 |
| | | | 429/422 |
| 2013/0130138 A1 | 5/2013 | Ukai et al. | |
| 2014/0065499 A1 | 3/2014 | McElroy et al. | |
| 2014/0106247 A1 | 4/2014 | Higdon et al. | |
| 2014/0272612 A1 | 9/2014 | Trevisan et al. | |
| 2017/0301939 A1* | 10/2017 | Upadhyayula | C10L 3/103 |
| 2019/0229352 A1* | 7/2019 | Junaedi | H01M 8/2425 |
| 2019/0305335 A1* | 10/2019 | Fisher | H01M 8/0618 |

FOREIGN PATENT DOCUMENTS

| | | |
|---|---|---|
| EP | 0 398 111 A1 | 11/1990 |
| EP | 0 977 294 B1 | 2/2000 |
| EP | 1057998 B1 | 11/2003 |
| EP | 1 501 146 A2 | 1/2005 |
| EP | 1513208 | 3/2005 |
| EP | 1571726 A1 | 9/2005 |
| EP | 1258453 B1 | 1/2007 |
| JP | 2004-270803 | 4/1994 |
| JP | 2001-307703 A | 11/2001 |
| JP | 2004-247290 | 9/2004 |
| JP | 2006049056 A | 2/2016 |
| JP | 2018067469 A | 4/2018 |
| WO | WO 1994/18712 | 8/1994 |
| WO | WO2000/061707 A1 | 10/2000 |
| WO | WO2003/019707 | 3/2003 |
| WO | WO2004/013258 A1 | 2/2004 |
| WO | WO2004/076017 | 9/2004 |
| WO | WO 2004/092756 | 10/2004 |
| WO | WO2004/093214 | 10/2004 |
| WO | WO2004/095618 | 11/2004 |

OTHER PUBLICATIONS

Hamburger, R. O., et al., "LabView DSC Automates Fuel Cell Catalyst Research," Nov. 4, 2004, http://web.archive.org/web/20041104200039/http://bloomy.com/newsletters/fuelcellresearch.pdf.

Austin, "Cell and Stack Construction: Low-Temperature Cells," *Fuel Cells: A Review of Government-Sponsored Research, 1950-1964*, NASA SP-120, pp. 101-102, (1967).

"Low Cost, Compact Solid Oxide Fuel Cell Generator," (Technology Management Inc.).

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

(56) References Cited

OTHER PUBLICATIONS

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

Supplemental European Search Report and Opinion, Intl. Application PCT/US2008/009069, mailed Nov. 4, 2011, 5 pages.

"Type BPL Granular Carbon", Calgon Product Bulletin, Calgon Corporation, Activated Carbon Division, 2 pgs.

Berlier, Karl et al., "Adsorption of $CO_2$ on Microporous Materials. 1. On Activated Carbon and Silica Gel", J. Chem. Eng. Data, 1997, vol. 42, pp. 533-537.

EG & G, Parsons, Inc., SAIC. Fuel Cell Handbook. $5^{th}$ Edition. USDOE. Oct. 2000. 9-1-9-4; 9-12-9-14.

LeVan, M. Douglas et al., "Adsorption and Ion Exchange", Perry's Chemical Engineers' Handbook ($7^{th}$ Edition), 1997, 66 pgs.

Levan, M. Douglas et al., "Fixed-Bed Adsorption of Gases: Effect of Velocity Variations on Transition Types", AlChE Journal, vol. 34, No. 6, Jun. 1988, pp. 996-1005.

Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.

Olivier, Marie-Georges et al., "Adsorption of Light Hyrdocarbons and Carbon Dioxide on Silica Gel", J. Chem. Eng. Data, 1997, vol. 42, pp. 230-233.

Qi, Nan et al., "Adsorption equilibrium modeling for water on activated carbons", Carbon, vol. 43, 2005, pp. 2258-2263.

Rudisill, Edgar N. et al., "Coadsorption of Hydrocarbons and Water on BPL Activated Carbon", Ind. Eng. Chem. Res., 1992, vol. 31, pp. 1122-1130.

Sward, Brian K. et al., "Simple Flow-Through Apparatus for Measurement of Mass Transfer Rates in Adsorbent Particles by Frequency Response", Fundamentals of Adsorption, K. Kaneko et al., eds., vol. 7, 2002, pp. 29-36. Published by IK International of Japan.

Sward, Brian K. et al., "Frequency Response Method for Measuring Mass Transfer Rates in Adsorbents via Pressure Perturbation", Adsorption, vol. 9, 2003, pp. 37-54.

Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.

Yang, Ralph T., "Adsorbents: Fundamentals and Applications", 2003, 4 pgs.

Yong, Zou et al., "Adsorption of Carbon Dioxide on Basic Alumina at High Temperatures", J. Chem. Eng. Data, 2000, vol. 45, pp. 1093-1095.

Yong, Zou et al., "Adsorption of carbon dioxide at high temperature—a review", Separation and Purification Technology, vol. 26, 2002, pp. 195-205.

Supplemental European Search Report and European Search Opinion, EP Application No. 06800263, Oct. 16, 2009, 11pgs.

Notification of Reasons of Refusal issued in Japanese Patent Application No. 2008-524022, Jan. 24, 2012.

Https://www.engineeringtoolbox.com/fuels-higher-calorific-values-d_169.html, viewed on Jun. 21, 2022.

Extended European Search Report for European Patent Application No. 22180082.4, mailed May 28, 2024, 9 pages.

Taiwan IP Office Communication and Search Report for Taiwan ROC (Taiwan) Patent Application No. 111122956, mailed Oct. 15, 2025, 11 pages, including English-language translation of the Search Report.

\* cited by examiner

HANDLING OF VARIABLE AND UNPREDICTABLE GAS COMPOSITION CHANGES TO MAXIMIZE HEALTH AND PERFORMANCE OF FUEL CELL SYSTEMS

FIELD

Aspects of this disclosure relate to fuel cell systems and methods, and more particularly, to a fuel cell system and method of controlling the fuel cell system.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

An embodiment fuel cell system includes a fuel inlet that receives a fuel gas from a fuel source, a gas analyzer that determines a composition of the fuel gas received by the fuel inlet, and a stack including fuel cells that generate electricity using the fuel gas received from the fuel source. The fuel cell system further includes a controller that controls at least one of a fuel utilization of the stack, current generated by the stack, or a voltage generated by the stack, based on the composition of the primary fuel gas determined by the gas analyzer. The controller may control the fuel cell system by increasing or decreasing a fuel flow rate to thereby increase or decrease the voltage generated by the stack to maintain a predetermined target voltage or to maintain a predetermined rate at which usable fuel is supplied to the stack based on composition.

An embodiment method may include receiving a primary fuel gas from a first fuel source and determining a composition of the primary fuel gas using a gas analyzer. The method may include providing the primary fuel gas to a stack including fuel cells to thereby generate electricity using the primary fuel gas. The method may further include controlling at least one of a fuel utilization of the stack, current generated by the stack, or a voltage generated by the stack, based on the composition of the primary fuel gas as determined by the gas analyzer.

A further disclosed method may include receiving a fuel gas from a fuel source, and providing the fuel gas to a stack including fuel cells to thereby generate electricity using the fuel gas. The method may include determining a voltage generated by the stack and determining that a frequency and/or amplitude of voltage changes exceed one or more respective thresholds. The method may further include controlling the voltage generated by the fuel cell system according to a voltage control mode. The voltage control mode may include performing a closed loop control method to maintain a predetermined target voltage generated by the stack.

BRIEF DESCRIPTION OF THE DRAWINGS

The accompanying drawings, which are incorporated herein and constitute part of this specification, illustrate example embodiments of the disclosure, and together with the general description given above and the detailed description given below, serve to explain the features of the disclosure.

DETAILED DESCRIPTION

Figure 1:
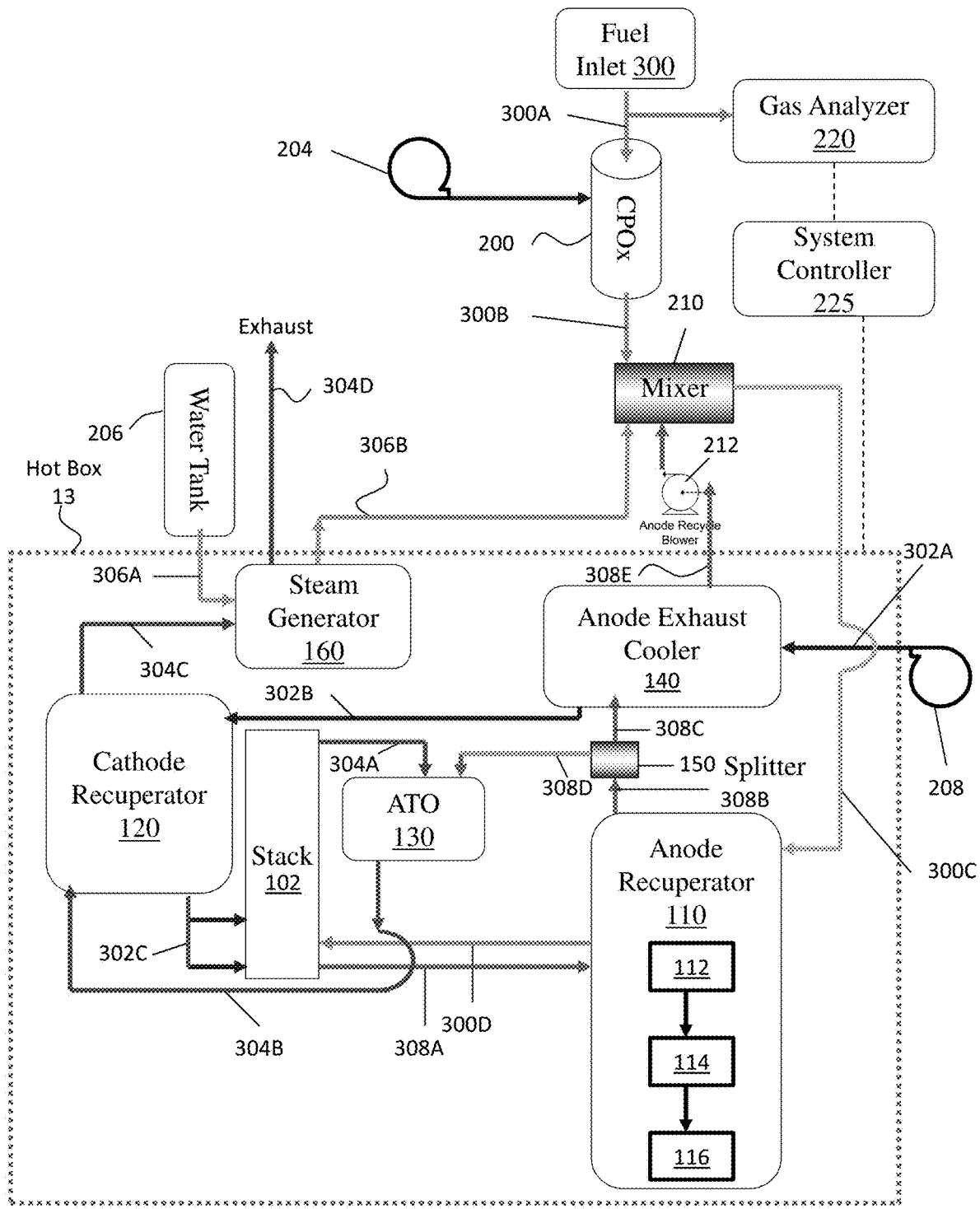
FIG. 1 is a schematic illustration of a solid oxide fuel cell system, according to various embodiments.

The various embodiments are described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Solid oxide fuel cell (SOFC) systems are generally configured to operate most efficiently using natural gas. However, many gas utilities mitigate peak winter demands by using propane peak shaving and standby systems. Most of these systems produce "propane-air" for direct replacement of natural gas during peak demand periods. Typical delivered compositions can be as high as around 30% propane, 25% air, and 45% methane, however some regions may be as low as 1%/1% propane/air (e.g., liquid propane air (LPA) and natural gas mixture). In conventional SOFC systems, the inclusion of air appears to facilitate coking and/or deactivation of reformation catalysts, which may lead to coking and deactivation of fuel cell anodes.

Other peak shaving gases may include higher hydrocarbons including more carbon atoms than methane, such as ethane, ethene, propane, propene, butane, pentane, isopentane, hexane, etc. Typical hydrocarbon fuels include saturated alkenes, such as ethane and propane ($C_2H_6$ and $C_3H_8$). Unsaturated alkenes, such as ethylene and propylene ($C_2H_4$ and $C_3H_6$) are not a normal constituent of natural gas in North America or worldwide, but may be introduced into some natural gas networks as a result of refining and chemical engineering processes (such as refinery by-products). However, unsaturated alkenes may result in the surface deposition of carbon (i.e., coking) with respect to various elements of fuel cell systems. For example, the coking may result in deactivation of catalyst surfaces and may provide nucleation sites for the creation of more coke. Once the coking process begins, the lifetime of a catalytic reactor may be severely compromised. Therefore, the prevention of coke formation is of high importance in reforming process engineering, in order to allow fuel cell systems to operate using fuels that contain unsaturated alkenes.

Exemplary fuels including higher hydrocarbons may include a combination of various molecules including CO, $CO_2$, $H_2O$, $H_2$, $O_2$, $N_2$, Ar, $CH_4$, $C_2H_6$, $C_2H_4$, $C_3H_8$, $C_3H_6$, n-$C_4H_{10}$ (n-butane), i-$C_4H_{10}$ (isobutane), $C_5H_{12}$, and $C_6H_{14}$ and the various molecules may represent different molecular fractions (or percentages) of the overall fuel. As examples, $CH_4$ may represent from less than 96% of the molecules in the fuel in the fuel inlet stream, e.g., 40.496% to 95.994% of the molecules, $C_2H_6$ may represent from 1.250% and 8.00% of the molecules in the fuel in the fuel inlet stream, $C_2H_4$ may represent from 0.040% to 8.00% of the molecules in the fuel in the fuel inlet stream, $C_3H_8$ may represent from 0.360% to 30.760% of the molecules in the fuel in the fuel inlet stream, $C_3H_6$ may represent from 0.001% to 1.620% of the molecules in the fuel in the fuel inlet stream, n-$C_4H_{10}$ may represent from 0.001% to 0.400% of the molecules in the fuel in the fuel inlet stream, i-$C_4H_{10}$ may represent from 0.001% to 0.200% of the molecules in the fuel in the fuel inlet stream, $C_5H_{12}$ may represent from 0.001% to 0.090% of the molecules in the fuel in the fuel inlet stream, and $C_6H_{14}$ may represent from 0.001% to 0.030% of the molecules in the fuel in the fuel inlet stream. Six exemplary fuel compositions are shown in Table I below.

The hot box 13 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 13 may also contain an anode recuperator 110, a cathode recuperator 120, an anode tail gas oxidizer (ATO) 130, an anode exhaust cooler 140, a splitter 150, and a steam generator 160. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 13. However, the present disclosure is not limited to any particular location for each of the components with respect to the hotbox 13.

The CPOx reactor 200 receives a fuel inlet stream from a fuel inlet 300, through fuel conduit 300A. The fuel inlet 300 may be a utility gas line including a valve to control an amount of fuel provided to the CPOx reactor 200. The CPOx blower 204 may provide air to the CPOx reactor 202. The fuel and/or air may be provided to the mixer 210 by fuel conduit 300B. Fuel (e.g., the fuel stream 1721 described below with respect to FIGS. 4A-4C) flows from the mixer 210 to the anode recuperator 110 through fuel conduit 300C. Fuel flows from the anode recuperator 110 to the stack 102 through fuel conduit 300D.

The main air blower 208 may be configured to provide an air stream (e.g., air inlet stream) to the anode exhaust cooler 140 through air conduit 302A. Air flows from the anode exhaust cooler 140 to the cathode recuperator through air

TABLE I

| Mole Fraction | Natural Gas (from PG&E) | Peak Shave Natural Gas High Propane, High Air | Peak Shave Natural Gas Lower Propane, Lower Air | Natural Gas Injected with Refinery Gases | Natural Gas with higher Ethane and Propane High Ethane | Natural Gas with higher Ethane and Propane Medium Ethane |
|---|---|---|---|---|---|---|
| CO | 0.001% | 0.001% | 0.001% | 0.001% | 0.001% | 0.001% |
| $CO_2$ | 1.300% | 0.300% | 0.360% | 4.000% | 1.300% | 2.200% |
| $H_2O$ | 0.001% | 0.001% | 0.001% | 0.001% | 0.001% | 0.001% |
| $H_2$ | 0.001% | 0.001% | 0.001% | 2.000% | 0.001% | 0.001% |
| $O_2$ | 0.001% | 5.300% | 4.280% | 0.001% | 0.001% | 0.001% |
| $N_2$ | 0.400% | 20.040% | 16.200% | 0.001% | 0.400% | 0.400% |
| Ar | 0.001% | 0.001% | 0.001% | 0.001% | 0.001% | 0.001% |
| $CH_4$ | 95.994% | 40.496% | 48.946% | 74.991% | 84.114% | 88.102% |
| $C_2H_6$ | 1.760% | 1.250% | 1.550% | 8.000% | 8.000% | 6.500% |
| $C_2H_4$ | 0.001% | 0.060% | 0.040% | 8.000% | 0.001% | 0.001% |
| $C_3H_8$ | 0.360% | 30.760% | 27.910% | 1.000% | 6.000% | 2.100% |
| $C_3H_6$ | 0.001% | 1.620% | 0.500% | 2.000% | 0.001% | 0.001% |
| n-$C_4H_{10}$ | 0.020% | 0.050% | 0.060% | 0.001% | 0.020% | 0.400% |
| i-$C_4H_{10}$ | 0.070% | 0.050% | 0.060% | 0.001% | 0.070% | 0.200% |
| $C_5H_{12}$ | 0.088% | 0.040% | 0.060% | 0.001% | 0.088% | 0.090% |
| $C_6H_{14}$ | 0.001% | 0.030% | 0.030% | 0.001% | 0.001% | 0.001% |

In conventional SOFC systems, the inclusion of air and/or higher hydrocarbons in a peak shaving fuel appears to facilitate coking and/or deactivation of reformation catalysts, which may lead to coking and deactivation of fuel cell anodes. Accordingly, there is a need for a SOFC system that is configured to operate using a wide variety of peak shaving gas compositions, without suffering from coking and/or catalyst deactivation.

FIG. 1 is a schematic representation of a SOFC system 10, according to various embodiments. Referring to FIG. 1, the system 10 includes a hotbox 13 and various components disposed therein or adjacent thereto.

conduit 302B. The air flows from the cathode recuperator 120 to the stack 102 through air conduit 302C.

Anode exhaust (e.g., the fuel exhaust stream 1723 described below with respect to FIGS. 4A-4C) generated in the stack 102 is provided to the anode recuperator 110 through recycling conduit 308A. The anode exhaust may contain unreacted fuel. The anode exhaust may also be referred to herein as fuel exhaust. The anode exhaust may be provided from the anode recuperator 110 to a splitter 150 by recycling conduit 308B. A first portion of the anode exhaust may be provided from the splitter 150 to the anode exhaust cooler 140 by exhaust conduit 308C. A second portion of the anode exhaust may be provided from the splitter 150 to the ATO 130 by recycling conduit 308D. Anode exhaust may be provided from the anode exhaust cooler 140 to mixer 210 by exhaust conduit 308E. The anode recycle blower 212 may be configured to move anode exhaust though recycling conduit 308E, as discussed below.

Cathode exhaust generated in the stack 102 flows to the ATO 130 through exhaust conduit 304A. Cathode exhaust and/or ATO exhaust generated in the ATO 130 flows from the ATO 130 to the cathode recuperator 120 through exhaust conduit 304B. Exhaust flows from the cathode recuperator 120 to the steam generator 160 through exhaust conduit 304C. Exhaust flows from the steam generator 160 and out of the hotbox 13 through exhaust conduit 304D.

Water flows from a water source 206, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 210 through water conduit 306B. Alternatively, if desired, the steam may be provided directly into the fuel inlet stream and/or the anode exhaust stream may be provided directly into the fuel inlet stream followed by humidification of the combined fuel streams. The mixer 210 is configured to mix the steam with anode exhaust and fuel. This fuel mixture may then be heated in the anode recuperator 110, before being provided to the stack 102.

The system 10 may further include a gas analyzer 220 configured to analyze the fuel in fuel conduit 300A and a system controller 225 configured to control various elements of the system 10. The controller 225 may include a central processing unit configured to execute stored instructions. For example, the controller 225 may be configured to control fuel and/or air flow through the system 10, according to fuel composition data received from the gas analyzer 220, as discussed in detail below. The system 10 may also include one or more fuel catalysts 112, 114, and 116, as discussed below.

Figure 2:
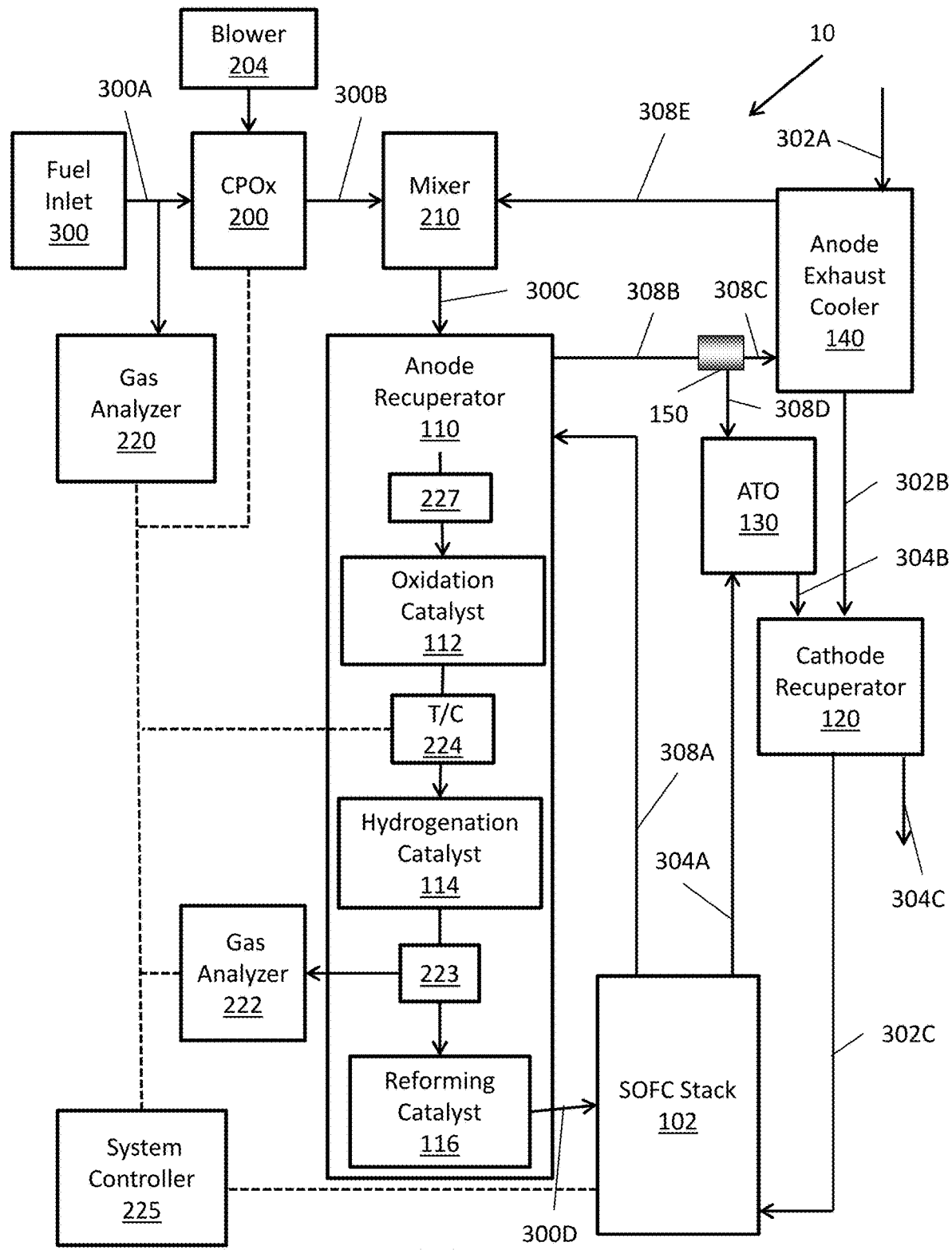
FIG. 2 is a schematic showing fuel flow through the fuel cell system of FIG. 1, according to various embodiments.

FIG. 2 is a flow diagram showing fuel flow through the system 10, according to various embodiments. Referring to FIGS. 1 and 2, fuel flows from the fuel inlet 300 into the CPOx reactor 200 during all modes of operation (e.g., during startup, steady state, and shutdown operations). The fuel may include a hydrocarbon fuel such as ethane or propane. The fuel may also include unsaturated alkenes, such as ethylene and propylene. The fuel may also include a certain amount of oxygen, such as part of the "propane-air" discussed above.

The gas analyzer 220 may be any detector configured to detect natural gas content, such as a hydrocarbon detector, a natural gas detector, a flame ionization detector, and/or an optical detector. For example, the gas analyzer 220 may be an infrared absorption based on-line monitoring system configured for measurement of alkanes: methane, ethane, propane, butanes and pentanes, such as a Precisive hydrocarbon composition analyzer (HCA) manufactured by MKS Instruments, Inc. The gas analyzer may also include an optional oxygen sensor.

The gas analyzer 220 may be configured to provide gas content to the overall fuel cell system controller 225, which may be configured to control one or more fuel cell stacks and/or systems at a given site (e.g., by increasing or decreasing an amount of fuel using a valve in the fuel inlet 300, and/or by increasing or decreasing a stack voltage or current, and/or by adjusting the speed of a fuel recycle blower 212 to control fuel utilization). This information may also be disseminated down to the individual fuel cell controllers for use in the control system algorithms. This information could be particularly useful for sensing substantial changes in gas quality/composition, and making according changes in control systems.

During a cold startup the fuel is partially oxidized in the CPOx reactor 200 by injection of air from the CPOx blower 204. The CPOx reactor 200 may include a glow plug to initiate this catalytic reaction. During this cold-start operational mode the CPOx reactor 200 may be operated at a temperature ranging from about 600° C. to about 800° C., such as from about 650° C. to about 750° C., or about 700° C. The CPOx blower 204 generally operates during startup, and is usually not operated during steady-state system operation.

However, when the gas analyzer 220 detects a high inlet ethane and/or propane concentration (e.g., a peak shaving event) during steady-state operation, the CPOx blower 204 may be operated to inject air into the fuel stream, without igniting the CPOx reaction (e.g., without operating a glow plug therein). As a result, some of the ethane may be converted to lower hydrocarbons downstream in the process by this injection. This method of air injection may be particularly applicable to SOFC systems that do not include a reformation catalyst configured to catalyze ethane and/or propane without a high probability of coking. In addition, this method may also be used with SOFC systems that do include such a reformation catalyst, when an ethane concentration exceeds the reformation capability thereof. For example, generally reformation catalysts may be configured to reform gas mixtures that contain less than about 15%, such as less than about 12%, or less than about 9% ethane and/or propane.

The fuel flows from the CPOx reactor 200 into the mixer 210, where it may be mixed with steam and/or anode exhaust stream in conduit 308E. The fuel then flows into the anode recuperator 110, where it is heated using hot anode exhaust emitted from the stack 102 via conduit 308A.

One or more of the catalysts 112, 114, 116 may be disposed within the anode recuperator 110, according to some embodiments. For example, one or more of the catalysts 112, 114, 116 may be disposed between walls of the anode recuperator 110, or may be disposed in an opening formed within the anode recuperator 110. In other embodiments, one or more of the catalysts 112, 114, 116 may be in the form of pucks or disks. In other embodiments, one or more of the catalysts 112, 114, 116 may be disposed outside of the anode recuperator 110 (e.g., upstream or downstream of the anode recuperator). In various embodiments, the catalysts 112, 114, 116 may include a metallic/ceramic foam with a catalytic layer (e.g., palladium, nickel and/or rhodium), a metallic/ceramic foam without a catalytic layer where the base metal of the foam is catalytically active (e.g., nickel), a large number of coiled wires with a catalytic layer, a packed bed of catalyst pellets, or any combination thereof.

The heated fuel enters an oxidation catalyst 112 either upstream of the anode recuperator 110 (if the oxidation catalyst 112 is located upstream of the anode recuperator 110) or while traveling through the anode recuperator 110 (if the oxidation catalyst 112 is located in the anode recuperator 110). The oxidation catalyst 112 may be a catalytic reactor configured to remove free oxygen ($O_2$) from the fuel. For example, the oxidation catalyst 112 may facilitate the reaction of oxygen with $H_2$, CO, and/or other natural gas components in the fuel. The removal of free oxygen prevents or reduces the oxidation of a reforming catalyst 116. The oxidation of the reforming catalyst 116 is thought to contribute to catalyst coking.

When there is no oxygen present in the fuel, the oxidation catalyst 112 may induce a small pressure drop to the fuel stream, such as approximately 10% or less of the normal reformer pressure loss. The oxidation catalyst 112 may be configured to operate at temperatures that can readily be achieved by heating with the anode exhaust. For example, the oxidation catalyst 112 may be configured to operate at temperatures ranging from about 100° C. to about 200° C., such as from about 125° C. to about 175° C., or about 150° C.

The oxidation catalyst 112 may include a nickel/rhodium catalyst layer on a ceramic base (e.g., support). The catalyst layer may also include other base metals such as zinc, cobalt and/or copper. The ceramic base of the oxidation catalyst may include any suitable ceramic base material, such as alumina, stabilized zirconia, lanthana and/or ceria. The oxidation catalyst 112 may be configured to remove from at least 90%, such as at least about 95%, at least about 97%, at least about 98%, or at least about 99% of the oxygen from the fuel. The oxidation catalyst 112 may be configured to remove free oxygen without excessive reformation of methane. For example, the oxidation catalyst 112 may be configured to reform less than about 20%, such as less than about 18%, less than about 15%, less than about 12%, or less than about 10% of the methane and/or other higher hydrocarbons included in the fuel. In various embodiments, the catalyst may be configured explicitly so as not to catalyze hydrocarbon reformation reactions.

The system 10 may optionally include a thermocouple (T/C) 224, or similar temperature detector, configured to detect the temperature of the fuel exiting the oxidation catalyst 112. An increase in the detected temperature may be used to determine the approximate content of one or more components of the fuel, such as whether oxygen is present in the fuel and/or specific hydrocarbon levels in the fuel. In some embodiments, the system may also include a T/C 227 configured to detect the temperature of fuel entering the oxidation catalyst 112, such that a temperature change of the fuel passing through the oxidation catalyst may be detected.

The fuel may then flow into a hydrogenation catalyst 114. The hydrogenation catalyst 114 may be a catalytic reactor configured to combine unsaturated hydrocarbons, such as ethylene and/or propylene (alkenes), with available hydrogen in the fuel stream, resulting in saturated hydrocarbons, such as ethane and propane or other alkanes.

The hydrogenation catalyst 114 may include a ceramic base, such as alumina, ceria, zirconia, or a mixture of ceria and zirconia, with a small percentage of a catalyst metal such as palladium. For example, the hydrogenation catalyst 114 may include an amount of palladium ranging from about 0.1 wt % to about 5 wt %. The hydrogenation catalyst 114 may be configured to operate at temperatures ranging from about 200° C. to about 450° C., such as from about 225° C. to about 425° C., or from about 250° C. to about 400° C. The hydrogenation catalyst 114 may be located in the anode recuperator 110.

The system 10 may include a sampling port 223 disposed adjacent an exit of the hydrogenation catalyst 114. For example, a gas analyzer 222 may be disposed at the sampling 223 port and may be configured as a general gas composition instrument, or an instrument configured to detect one water vapor content and/or more specific gas components.

The fuel then flows into a reforming catalyst 116. The reforming catalyst 116 may be a catalytic reactor configured to partially reform the fuel before the fuel is delivered to the stack 102. The reformation reaction is endothermic (e.g., a steam methane reformation (SMR) reaction) and may operate to cool the fuel prior to feeding the stack. The reforming catalyst 116 may include one or more nickel/rhodium catalysts configured to reform higher hydrocarbons (C2-C5) at very broad steam to carbon ratios. For example, the reforming catalyst 116 may be configured to reform a fuel stream having at least 10 vol % of C2 and C3 hydrocarbons, without significant coke formation. For example, the reforming catalyst 116 may be configured to reform a fuel stream having up to 20 vol %, up to 18 vol %, up to 16 vol %, up to 14 vol %, or up to 12 vol % of C2 and C3 hydrocarbons.

The fuel is then reacted in the stack 102, and the resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208.

The system controller 225 may be configured to adjust a fuel flow rate from the fuel inlet 300, an air flow rate from the CPOx blower 204, and/or a speed of the anode recycle blower 212, based on the composition of the fuel. For example, the fuel flow rate may be increased to prevent starvation of the stack 102, when the free oxygen content of the fuel is high, since fuel is consumed when the oxygen is removed in the oxidation catalyst 112.

The system controller 225 may also use other feedback signals to determine correct fuel flow rate, such as stack voltage at operating current and the temperature of the ATO 130, in order to detect and/or respond to a peak shaving event. For example, a reduction in the temperature of the ATO 130 and/or a reduction in the fuel cell stack 102 voltage may indicate that the stack 102 is starved for fuel. If the fuel flow rate is too high, the temperature of the ATO 130 may rise above a normal operating temperature and/or the stack voltage may also experience a similar increase. In some embodiments, the controller 225 may be configured to compare the measured stack voltage to a recent history of stack voltage at a similar current level, when no peak shaving event was occurring, in order to determine whether fuel flow, anode exhaust recycle flow, and/or air flow should be adjusted.

In some embodiments, the controller 225 may be configured to receive a supervisory control and data acquisition (SCADA) signal from a gas utility before a peak shaving event occurs. The signal may include the composition of the peak shaving gas and/or the timing of the peak shaving event. The controller 225 may be configured to control the operation of the system 10, based on the signal. For example, the controller 225 may cause the system 10 to return to normal operation after the peak shaving event expires.

Accordingly, the fuel cell system 10 may be configured to operate in a broad range of fuel environments, which may allow for the system 10 to be implemented in areas where operation was previously difficult or impractical because of prohibitive levels of air, propane, and/or ethane, ethylene, propylene, is provided in fuel. The system 10 may also provide for increased fuel cell stack life by providing more consistent pre-reformation across the whole range of natural gas quality/composition.

Figure 3A:
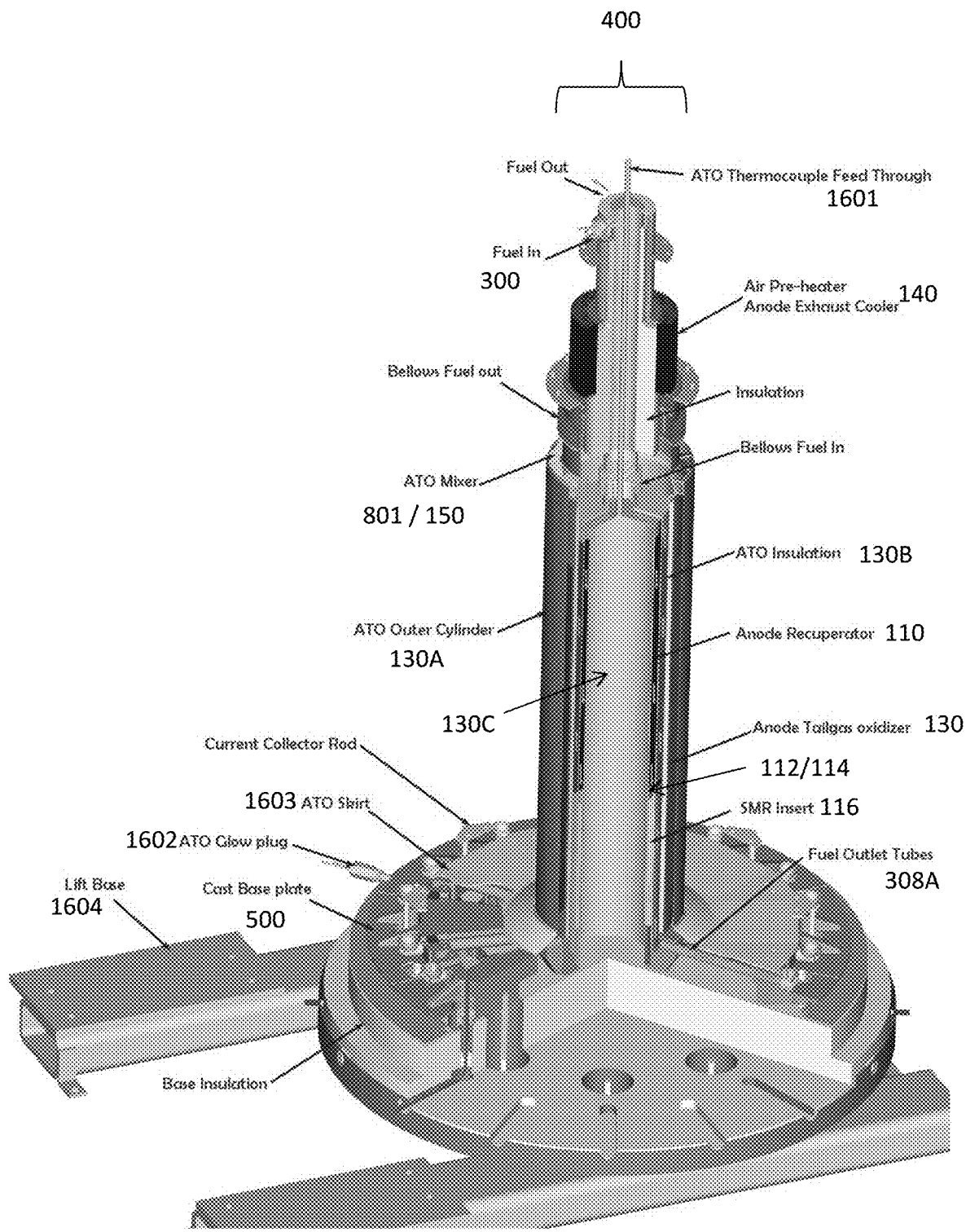
FIG. 3A is a sectional perspective view of a central column of the fuel cell system of FIG. 1, according to various embodiments.
Figure 3B:
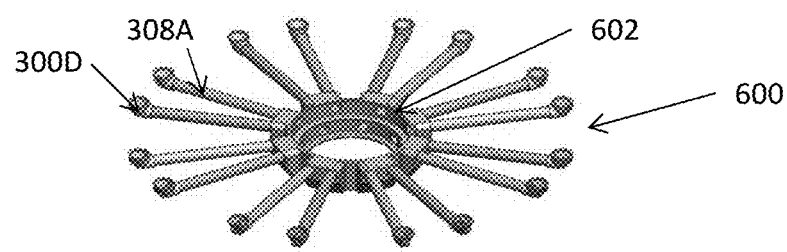
FIG. 3B illustrates an anode hub structure connected to the column of FIG. 3A, according to various embodiments.

FIG. 3A illustrates a central column 400 of the system 10, according to various embodiments. FIG. 3B illustrates an anode hub structure 600 disposed in a hot box base 500 on which the column 400 may be disposed. Referring to FIGS. 3A and 3B, fuel cell stacks (not shown) may be disposed around the column 400, on the hot box base 500. The column 400 includes the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130. The oxidation catalyst 112 and/or the hydrogenation catalyst 114 may be located in the anode recuperator 110. The reforming catalyst 116 may also be located at the bottom of the anode recuperator 110 as a steam methane reformation (SMR) insert.

The ATO 130 may include an outer cylinder 130A that is positioned around inner ATO insulation 130B/outer wall of the anode recuperator 110. Optionally, the insulation 130B may be enclosed by an inner ATO cylinder 130C. Thus, the insulation 130B may be located between the anode recuperator 110 and the ATO 130. An ATO oxidation catalyst may be located in the space between the outer cylinder 130A and the ATO insulation 130B. An ATO thermocouple feed through 1601 extends through the anode exhaust cooler 140, to the top of the ATO 130. The temperature of the ATO 130 may thereby be monitored by inserting one or more thermocouples (not shown) through this feed through 1601.

The anode hub structure 600 is positioned under the anode recuperator 110 and ATO 130 and over the hot box base 500. The anode hub structure 600 is covered by an ATO skirt 1603. A combined ATO mixer 801 and fuel exhaust splitter 150 is located over the anode recuperator 110 and ATO 130 and below the anode cooler 140. An ATO glow plug 1602, which initiates the oxidation of the stack fuel exhaust in the ATO during startup, may be located near the bottom of the ATO 130.

The anode hub structure 600 is used to distribute fuel evenly from a central plenum to fuel cell stacks disposed around the central column 400. The anode flow hub structure 600 includes a grooved cast base 602 and a "spider" hub of fuel inlet conduits 300D and outlet conduits 308A. Each pair of conduits 300D, 308A connects to a fuel cell stack. Anode side cylinders (e.g., anode recuperator 110 inner and outer cylinders and ATO outer cylinder 130A) are then welded or brazed into the grooves in the base 602, creating a uniform volume cross section for flow distribution as discussed below.

Also illustrated in FIG. 3A, is a lift base 1604 located under the hot box base 500. In an embodiment, the lift base 1604 includes two hollow arms with which the forks of a fork truck can be inserted to lift and move the fuel cell unit, such as to remove the fuel cell unit from a cabinet (not shown) for repair or servicing.

Figure 4C:
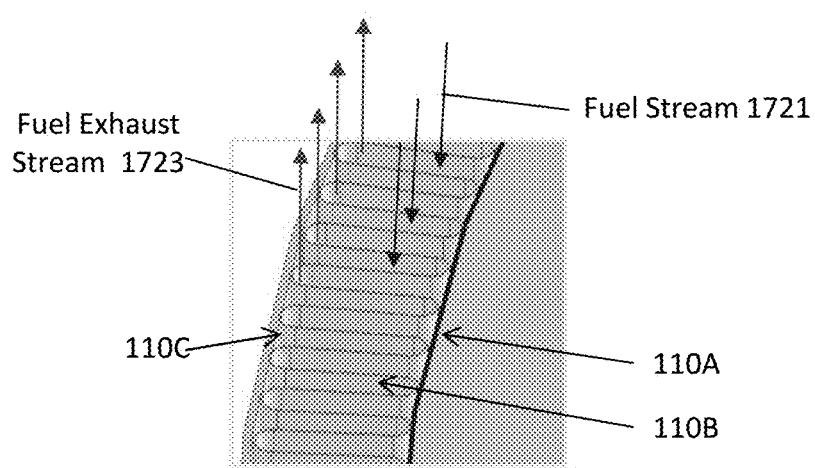
FIGS. 4A-4C are perspective and sectional views of components of the central column of FIG. 3A, according to various embodiments.
Figure 4A:
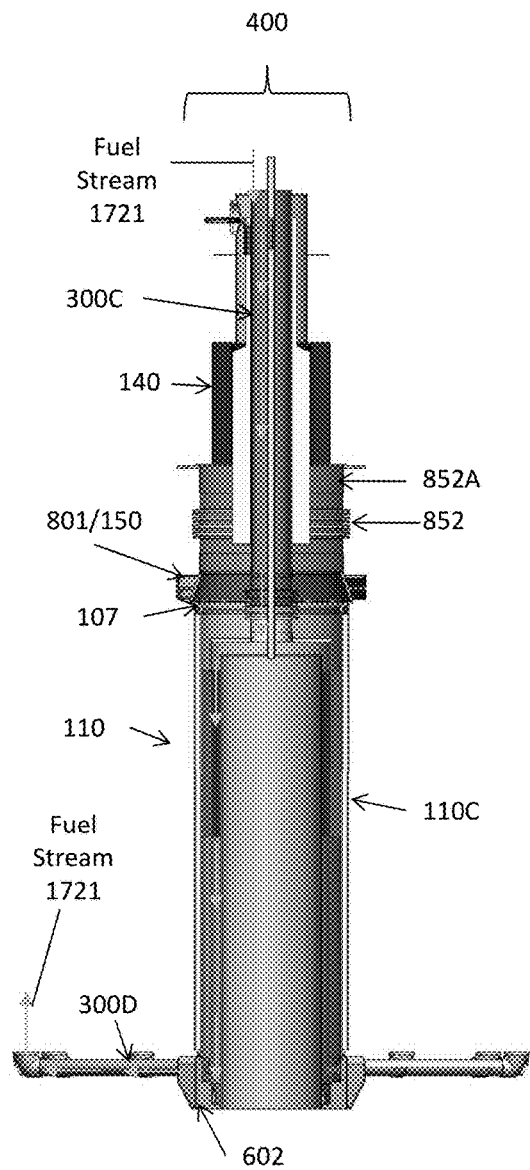
Figure 4B:
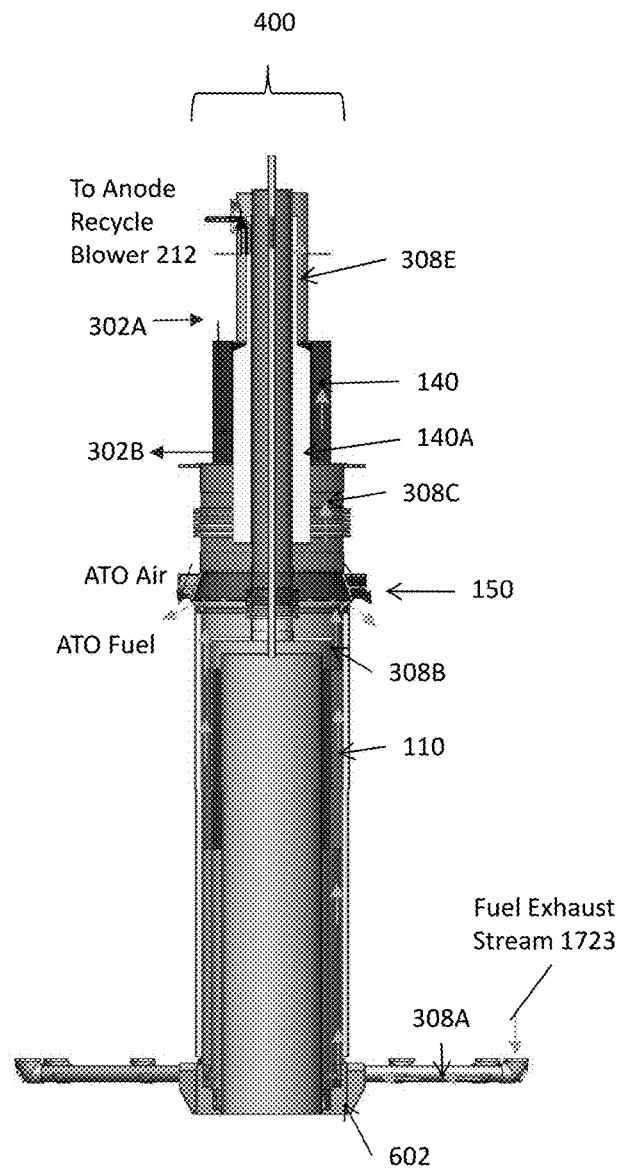

FIGS. 4A and 4B are side cross-sectional views showing flow distribution through the central column 400, and 4C is top cross-sectional view taken through the anode recuperator 110. Referring to FIGS. 1, 4A and 4C, the anode recuperator 110 includes an inner cylinder 110A, a corrugated plate 110B, and an outer cylinder 110C that may be coated with the ATO insulation 130B. A fuel stream 1721 from fuel conduit 300C enters the top of the central column 400. The fuel stream 1721 then bypasses the anode cooler 140 by flowing through its hollow core and then flows through the anode recuperator 110, between the outer cylinder 110C and the and the corrugated plate 110B. The fuel stream 1721 then flows through the hub base 602 and conduits 300D of the anode hub structure 600 (FIG. 3B), to the stacks.

Referring to FIGS. 1, 4B and 4C, a fuel exhaust stream 1723 flows from the stacks through conduits 308A into the hub base 602, and from the hub base 602 through the anode recuperator 110, between in inner cylinder 110A and the corrugated plate 110B, and into the splitter 150. A portion of the fuel exhaust flow stream 1723 flows from the splitter 150 to the anode cooler 140 through conduit 308C, while another portion flows from the splitter 150 to the ATO 130 through conduit 308D (see FIG. 1). Anode cooler inner core insulation 140A may be located between the fuel conduit 300C and bellows 852/supporting cylinder 852A located between the anode cooler 140 and the ATO mixer 801, as shown in FIGS. 3, 4B, and 4C. This insulation minimizes heat transfer and loss from the anode exhaust stream in conduit 308C on the way to the anode cooler 140. Insulation 140A may also be located between conduit 300C and the anode cooler 140 to avoid heat transfer between the fuel inlet stream in conduit 300C and the streams in the anode cooler 140. A bellows 852 and a cylinder 852A may be disposed between the anode cooler 140 and the splitter 150.

FIG. 4B also shows air flowing from the air conduit 302A to the anode cooler 140 (where it exchanges heat with the fuel exhaust stream), into conduit 302B to the cathode recuperator 120. Embodiments of the anode flow hub 600 may have one or more of the following advantages: lower cost manufacturing method, ability to use fuel tube in reformation process if required and reduced complexity.

As described in greater detail below, and as shown in FIGS. 1 and 4B, the fuel exhaust stream 1723 exits the anode recuperator 110 and is provided into splitter 150 through conduit 308B. The splitter 150 splits the anode exhaust stream into first and second anode exhaust streams. The first stream is provided to the ATO 130 through conduit 308D. The second stream is provided into the anode cooler 140 through conduit 308C.

The relative amounts of anode exhaust provided to the ATO 130 and the anode exhaust cooler 140 is controlled by the anode recycle blower 212. The higher the blower 212 speed, the larger portion of the fuel exhaust stream is provided into conduit 308C and a smaller portion of the fuel exhaust stream is provided to the ATO 130, and vice-versa. The splitter 150 may include an integral cast structure with the ATO mixer 801.

The anode exhaust provided to the ATO 130 is not cooled in the anode exhaust cooler 140. This allows higher temperature anode exhaust to be provided into the ATO 130 than if the anode exhaust were provided after flowing through the anode exhaust cooler 140. For example, the anode exhaust provided into the ATO 130 from the splitter 150 may have a temperature of above 350° C., such as from about 350 to about 500° C., for example, from about 375 to about 425° C., or from about 390 to about 410° C. Furthermore, since a smaller amount of anode exhaust is provided into the anode cooler 140 (e.g., not 100% of the anode exhaust is provided into the anode cooler due to the splitting of the anode exhaust in splitter 150), the heat exchange area of the anode cooler 140 may be reduced.

The anode exhaust stream provided to the ATO 130 may be combusted and provided to the cathode recuperator 120 through conduit 304B.

Figure 5:
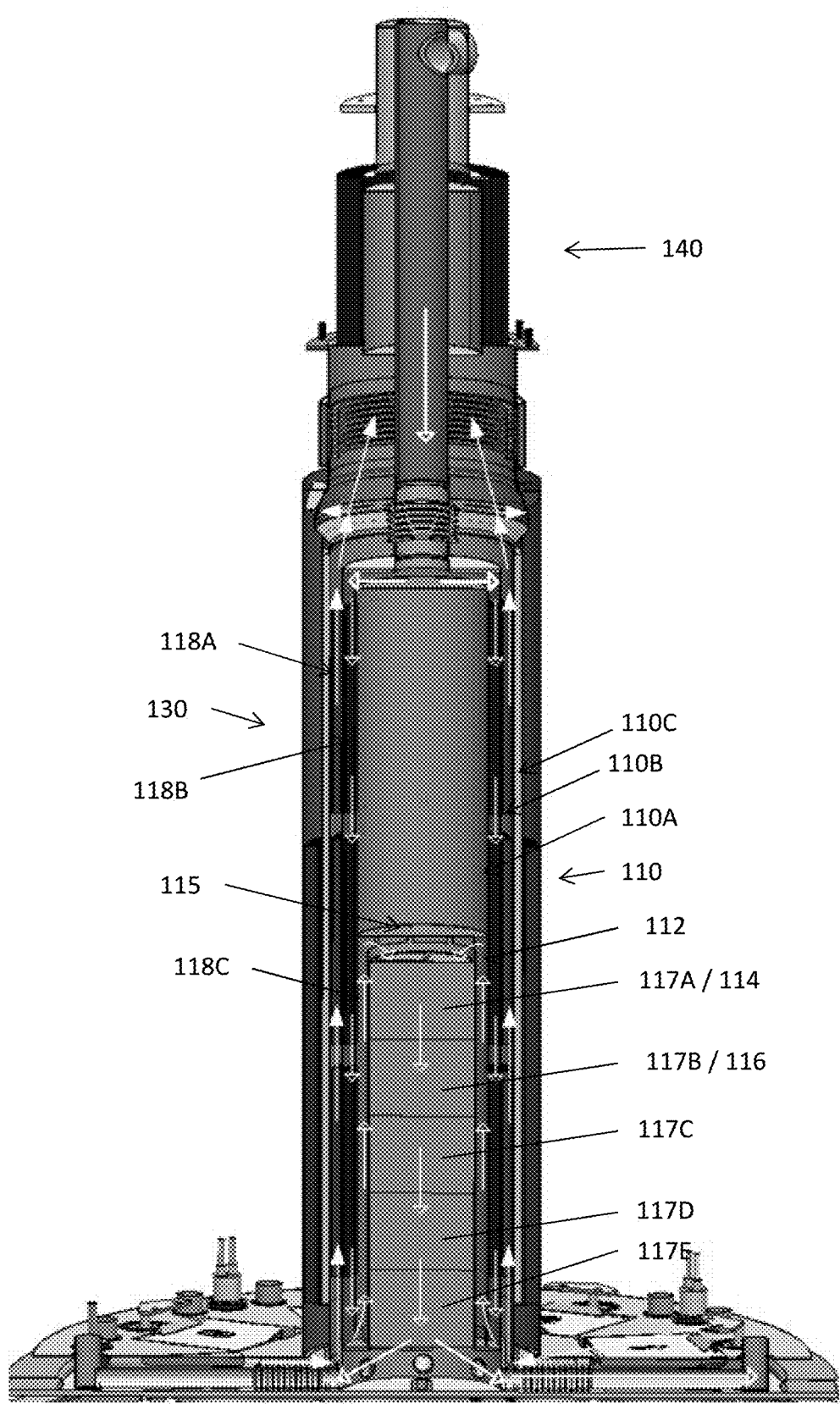
FIG. 5 is a sectional view of a central column of a fuel cell system, according to various embodiments.

FIG. 5 illustrates a modified central column 401 of the system 10, according to various embodiments. The central column 401 is similar to the central column 400 of FIG. 3, so only the difference therebetween will be described in detail.

Referring to FIG. 5, an oxidation catalyst 112 is disposed in the column 401 between the inner cylinder 110A and corrugated plate 110B of the anode recuperator 110. The column 401 includes a catalyst housing 115 disposed inside a central cavity of the anode recuperator 110. The catalyst housing includes one or more catalyst pucks 117A-117E. Each puck 117 may include the same catalyst, or one or more of the pucks 117 may include different catalysts. For example, puck 117A may include the hydrogenation catalyst 114, and pucks 117B-117E may include one or more reformer catalysts 116.

In some embodiments, the temperature in various portions of the anode recuperator 110 may be controlled by controlling the size and or length of various conduits therein. The target temperature and/or temperature range may be selected based on the properties (e.g., effectiveness, cost, etc.) of the catalyst located within the annular pre-reformer and/or an expected inlet fuel stream composition. As an example, a higher target temperature may be selected to support the conversion of higher hydrocarbons by a less effective catalyst (e.g., all nickel) while a lower target temperature may be selected for use with a more effective catalyst (e.g., all rhodium or all platinum). The target temperature and/or temperature range may be selected to favor the reformation of higher hydrocarbons over the reformation of methane in the pre-reformer (e.g., reforming catalyst 116). In an embodiment, the oxidation catalyst 112 may be located within the anode recuperator 110 but may be separated radially from the annular anode exhaust passage of the anode recuperator 110 by one or more fuel inlet passages (e.g., conduits). For example, as shown in FIG. 5, the oxidation catalyst 112 may be in the form of one or more of the pucks 117A-117E located in the interior of the anode recuperator 110 (e.g., within the inner cylinder 110A which is separated from the anode recuperator fuel exhaust passage 118A by one or more fuel inlet passages 118B and/or 118C passing through the anode recuperator 110). Alternatively, the oxidation catalyst 112 may be located in fuel inlet passage 118C which is separated from the fuel exhaust passage 118A by the initial fuel inlet passage 118B. In this manner, the ambient temperature of the oxidation catalyst 112 may be maintained at a temperature lower than the fuel inlet stream entering the annular pre-reformer from a fuel inlet passage of the anode recuperator 110 and lower than the temperature of the anode exhaust in the anode exhaust passage.

Figure 6:
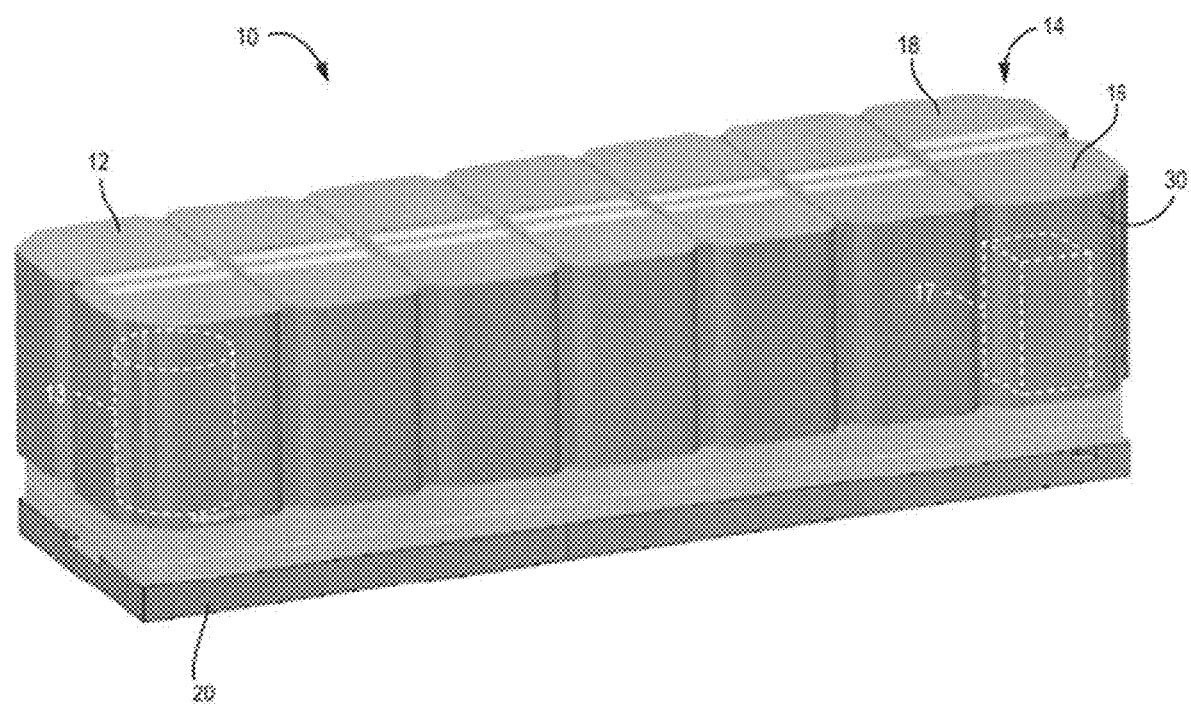
FIG. 6 is an isometric view of a modular fuel cell system enclosure, according to various embodiments.

Referring to FIG. 6, a modular fuel cell system 10 is shown according to an exemplary embodiment. The modular system may contain modules and components described in U.S. Pat. No. 9,755,263 B2 issued on Sep. 5, 2017 and incorporated herein by reference in its entirety.

The modular fuel cell system 10 includes at least one (preferably more than one or plurality) of power modules 12, one or more fuel input (i.e., fuel processing) modules 16, and one or more power conditioning (i.e., electrical output) modules 18. In embodiments, the power conditioning modules 18 are configured to deliver direct current (DC). In alternative embodiments, the power conditioning modules 18 are configured to deliver alternating current (AC). In these embodiments, the power condition modules include a mechanism to convert DC to AC, such as an inverter. For example, the system enclosure may include any desired number of modules, such as 2-30 power modules, for example 3-12 power modules, such as 6-12 modules. FIG. 6 illustrates a system 10 containing six power modules 12 (one row of six modules stacked side to side), one fuel processing module 16, and one power conditioning module 18 on a common base 20. Each module 12, 16, 18 may have its own cabinet. Alternatively, as will be described in more detail below, modules 16 and 18 may be combined into a single input/output module 14 located in one cabinet. While one row of power modules 12 is shown, the system may include more than one row of modules 12. For example, the system may include two rows of power modules arranged back to back/end to end.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may include externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system 10 also contains one or more input or fuel processing modules 16. This module 16 includes a cabinet which contains the components used for pre-processing of fuel, such as adsorption beds (e.g., desulfurizer and/or other impurity adsorption) beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller 225 (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 6, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in the preferred embodiment, the input/output module 14 is at the end of the row of power modules 12, it could also be located in the center of a row power modules 12.

The modular fuel cell system 10 may be configured in a way to ease servicing of the system. All of the routinely or high serviced components (such as the consumable components) may be placed in a single module to reduce amount of time required for the service person. For example, a purge gas (optional) and desulfurizer material for a natural gas fueled system may be placed in a single module (e.g., a fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system including a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

The internal components of the power module 12 may need to be periodically removed, such as to be serviced, repaired or replaced. Conventionally, the components, such as the hot box or the balance of plant components are removed from the power module 12 with a forklift. While conventional fuel cell assemblies may require substantial space on all sides to position a forklift and remove the components from an enclosure, sometimes as much as four to five times the length of the hot box.

Figure 7:
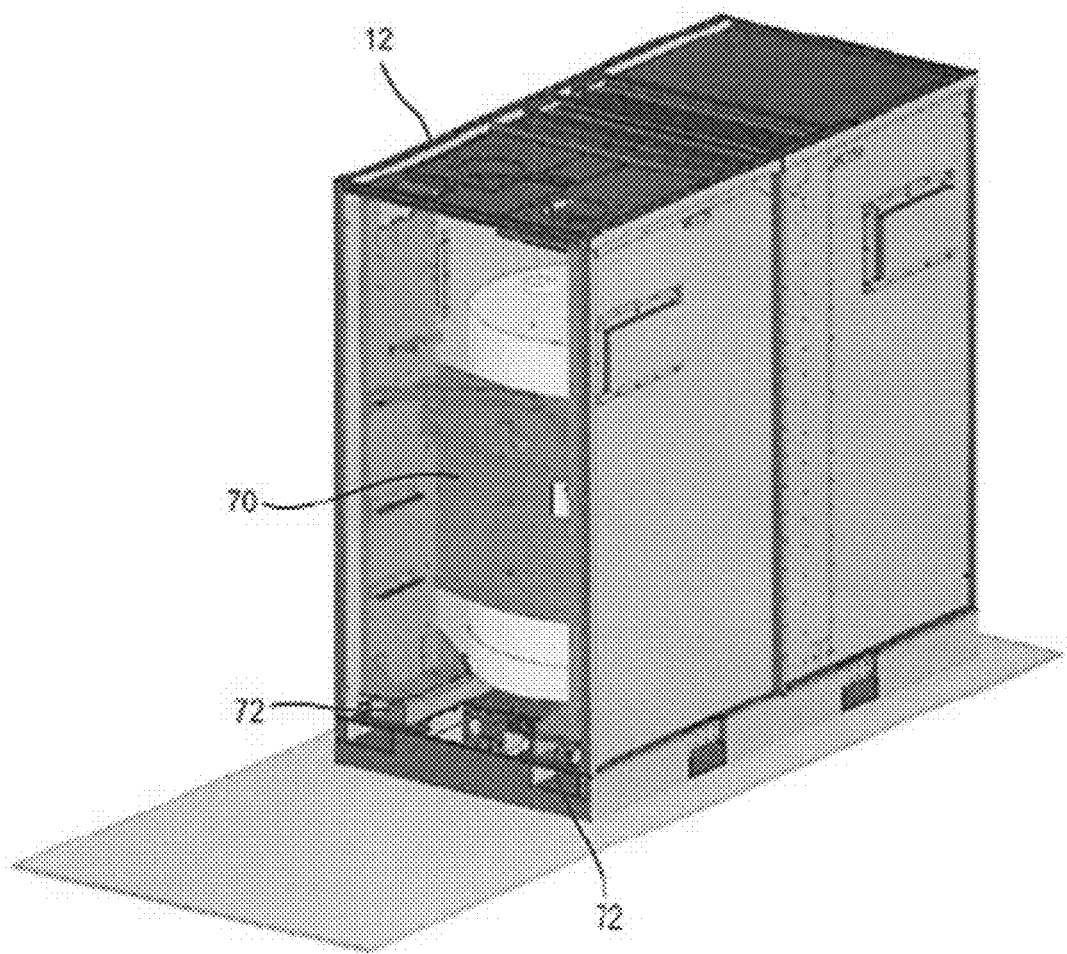
FIG. 7 is an isometric view showing a location of a hot box inside the module enclosure with the enclosure door removed, according to various embodiments.

As shown in FIG. 7, a field replaceable fuel cell module (FCM) 70 includes the hot box sub-system 13, such as the cylindrical hot box 13 described above with respect to FIG. 1, which contains the fuel cell stacks and heat exchanger assembly, as well as a balance of plant (BOP) sub-system including blowers, valves, and control boards, etc. The FCM 70 is mounted on a removable support 72 which allows the FCM 70 to be removed from the power module 12 cabinet as a single unit. FIG. 7 shows a non-limiting example of a FCM 70 configuration where the FCM 70 includes a cylindrical hot box 13 and a frame which supports the BOP components. The hot box and the frame are mounted on common support, such as fork-lift rails 72. Other configurations may also be used. For example, the hot box 13 may have a shape other than cylindrical, such as polygonal, etc. The support 72 may include a platform rather than rails. The frame may have a different configuration or it may be omitted entirely with the BOP components mounted onto the hotbox 13 and/or the support 72 instead. The FCM 70 is dimensionally smaller than the opening in the power module 12 (e.g., the opening closed by the door 30). According to an exemplary embodiment, the FCM 70 is installed or removed from the power module 12 cabinet as a single assembly. The FCM 70 is coupled to the other components of the enclosure 10 using a minimal number of quick connect/disconnect connections (e.g., to connect to the water conduits, fuel conduits, and bus bar conduits housed in the base 20) in order to ensure rapid servicing time, as described in the prior embodiments.

Figure 8A:
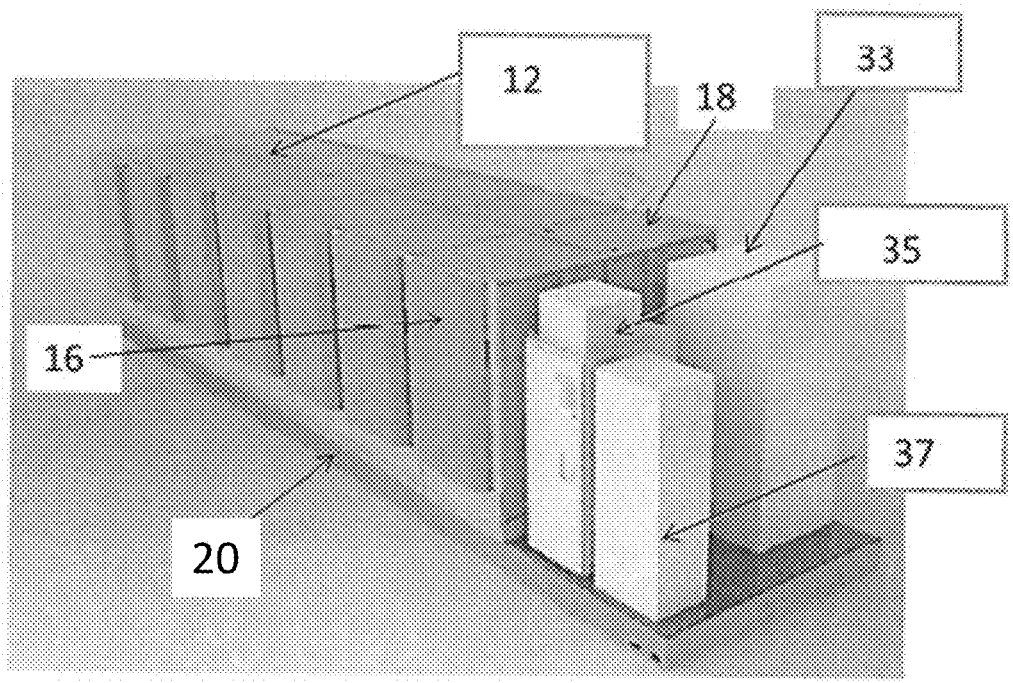
FIG. 8A an isometric view of a modular fuel cell system enclosure, according to various embodiments.
Figure 8B:
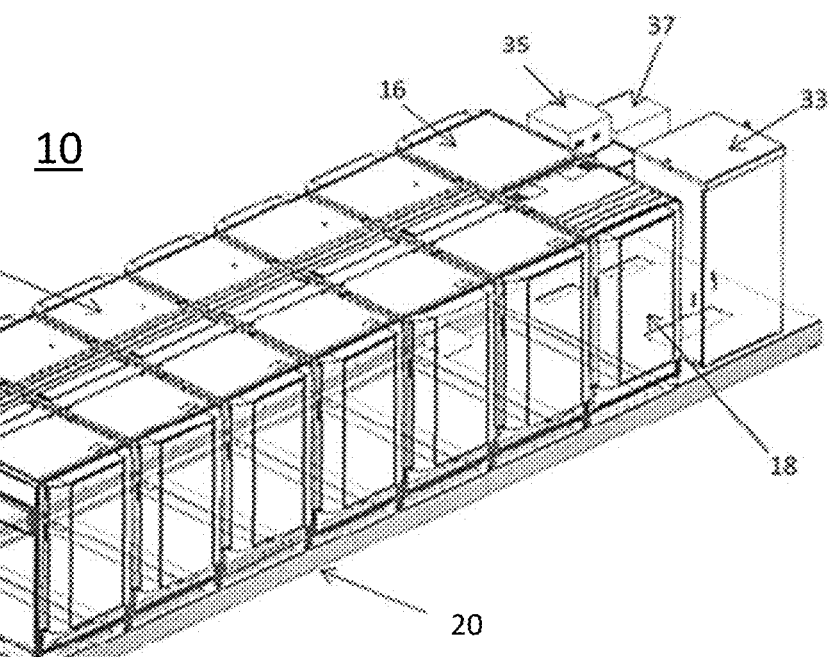
FIG. 8B is a schematic diagram of the embodiment illustrated in FIG. 8A, according to various embodiments.

FIGS. 8A and 8B illustrate a fuel cell system 10 with two rows of power modules 12, a fuel processing module 16, a power conditioning module 18, and three ancillary modules. In this embodiment, the ancillary modules include a water distribution module 33, a telemetry module 35, and a power distribution system module 37. The water distribution module 33 deionizes and/or filters input water and thereby provides deionized water to the power modules 12 of the fuel cell system. The power distribution system module 37 may include one or more circuit breakers and/or relays between the fuel cell system power output from module 18 and electrical power consumer. The telemetry module 35 includes a transceiver that provides system process information to a location remote from the system (e.g., central control room located distal from the fuel cell system location) and allows remote control of the fuel cell system. The system process information may include one or more of electricity production, electricity consumption, fuel consumption, water consumption, and fuel cell stack temperature. The telemetry module 35 may communicate to the remote location wirelessly or via wires, such as though cable or telephone wire.

Additional embodiments may include various methods of controlling a fuel cell system 10 described above with respect to FIGS. 1, 6 and 8A-8B. For example, a gas analyzer 220 shown in FIG. 1 may be configured to actively monitor and record composition data of the fuel (e.g., fuel inlet stream, such as a gas fuel stream). Composition data may be processed by the system controller 225 shown in FIG. 1, which may then provide such data to power modules 12 (shown in FIGS. 6-8B). Specifically, some fuels, such as biofuels may have variations over time due to variations in the biofuel production process. Likewise, marine fuels used for ships may have somewhat different compositions depending on the port or country in which the marine fuel is pumped into the ship containing a fuel cell system. Furthermore, the peak shaving described above may alter the fuel composition provided to the fuel cell system.

In certain embodiments, the gas analyzer 220 may be only configured to detect a portion of the chemical components of the incoming fuel gas. The gas analyzer 220 may be a non-dispersive infrared (NDIR) gas analyzer or any other suitable type of gas composition sensor. In such situations, the system controller 225 may be configured to determine the full composition of the incoming gas by extrapolation from data generated by the gas analyzer 220 in combination with composition data received from another data sources (e.g., from a gas supplier). In certain embodiments, the primary gas received from a first source may be blended with a secondary gas received from a second source to generate a blended fuel, as described in greater detail below. The system controller 225 may be further configured to determine a gas composition of the blended fuel based on data generated by the gas analyzer 220, composition data from a gas supplier, and from composition data for the secondary gas. Composition data for the secondary gas may be generated by the gas analyzer 220 and/or based on data provided by a supplier of the secondary gas.

If the gas analyzer 220 is not configured to or not capable of detecting one or more gases in the fuel gas stream, then the fuel gas steam composition data may be extrapolated by the system controller 225 as follows. For example, the gas analyzer 220 may be a NDIR gas analyzer which configured to detect methane, oxygen, and carbon dioxide, but is not configured to detect propane and heavy hydrocarbon fuels. In this case, if the fuel gas stream contains propane in addition to the detectable gases (e.g., methane), then the system controller 225 may be configured to extrapolate the amount of propane that is in the fuel gas stream based on the detectable values of the other gases in the fuel gas stream. In other words, when the total volume or flow rate of the fuel gas stream is known or detected, then the system controller 225 may subtracted the detected gas composition from the total fuel gas flow stream, and then extrapolate the amount and/or composition of the remaining component(s) of the fuel gas stream based on external data (e.g., time of year, time of day, data from fuel provider, etc.) and/or based on internal data (e.g., detected fuel cell system generated voltage, fuel utilization, temperature, etc.). When the primary and secondary gases are blended, the system controller 225 may be configured to determine a composition of the blended fuel gas stream based on determined compositions of the primary and secondary gases and based on a blending ratio of the primary gas and the secondary gas.

In embodiments in which real-time control is required, data generated by the gas analyzer 220 may be transmitted from the system controller 225 to one or more power module supervisory controllers (not shown). The power module supervisory controller(s) may then distribute the data to various power modules 12 shown in FIGS. 6-8B. The distribution may be performed with two configurable delay functions to match when the gas that was detected will reach the power module. The first delay may be associated with the system controller 225 and may define when and how the compositional change reaches the power module. This delay may be tuned according to the geometry of the installation and may be adjusted in real time as a function of total fuel flow rate. The second delay is at the power module supervisory controller and defines when and how each power module 12 will see the compositional change. This delay is defined by the geometry and makeup of the fuel processing module 16. In other words, it takes the fuel gas stream a certain amount of time to pass through the desulfurizers 17 in the fuel processing module 16. Thus, the delay period may correspond to the time it takes the fuel to flow from the gas analyzer 220 through the fuel processing module 16 to the inlet valve of the fuel processing modules 12. Thus, the change in the fuel flow rate controlled by the inlet valve of the fuel processing module 12 and/or the anode exhaust recycle rate controlled by the speed of the anode recycle blower 212 due to the composition change in the fuel detected by the gas analyzer 220 may be delayed by the above described delay period.

In the event of low fuel availability or low heating value of the fuel gas that prevents the power modules 12 from reaching a desired steady state power, then the system may blend in a high heating value secondary fuel to the primary fuel, as described above, assuming such blending would not cause severe impact to system health and performance. For example, biogas fuel flow rate and/or composition may be varied over time due to the vagaries of the biogas fuel production process. The primary and secondary fuel may be blended in various ways. In a first embodiment, upon detection of low primary fuel (e.g., biogas) availability, then the system controller 225 may automatically blend in a high fuel capacity secondary gas, such as natural gas from a pipeline, to thereby maintain a minimum fuel availability or minimum lower heating value of the blended fuel.

As used herein, fuel availability may be calculated using the following formula: Fuel Availability=single(4)*Carbon Atoms+Hydrogen Atoms−single(2)*Oxygen Atoms. As used herein, lower heating value corresponds to lower calorific value/net calorific value, where products of combustion contain the water vapor and the heat in the water vapor is not recovered, while higher heating value corresponds to higher calorific value/gross calorific value, where the water of combustion is entirely condensed and the heat contained in the water vapor is recovered, as defined in the Engineering Toolbox (https://www.engineeringtoolbox.com/fuels-higher-calorific-values-d_169.html), incorporated herein by reference. As used herein, the term "heating value" corresponds to the lower heating value unless specified otherwise.

The system controller 225 may use a closed loop control method that continually adjusts the proportion of high fuel availability secondary gas to the primary fuel gas. Alternatively, the system controller 225 may use an open loop control method that sets a constant flow rate of each of the primary and secondary gases based on downstream demand. Alternatively, the system controller 225 may control the primary gas to maintain a predetermined flow setpoint in a closed loop control method that controls a modulated fuel control valve and a flow meter (not shown). The secondary gas having a high fuel availability, such as natural gas, may act passively. For example, by setting the secondary gas to have a fixed lower pressure and keeping the valves open, the secondary gas will fill any pressure drop caused by a lower gas flow of the controlled primary gas (e.g., flow rate of the primary gas falling below a predetermined total flow rate). In this method the secondary gas is automatically blended with the primary gas. The flow of the secondary gas may be recorded via a flow meter. The total flow of the primary and secondary gas may be used to determine a more accurate blended composition. Such composition data may then be transmitted the power module.

Figure 9:
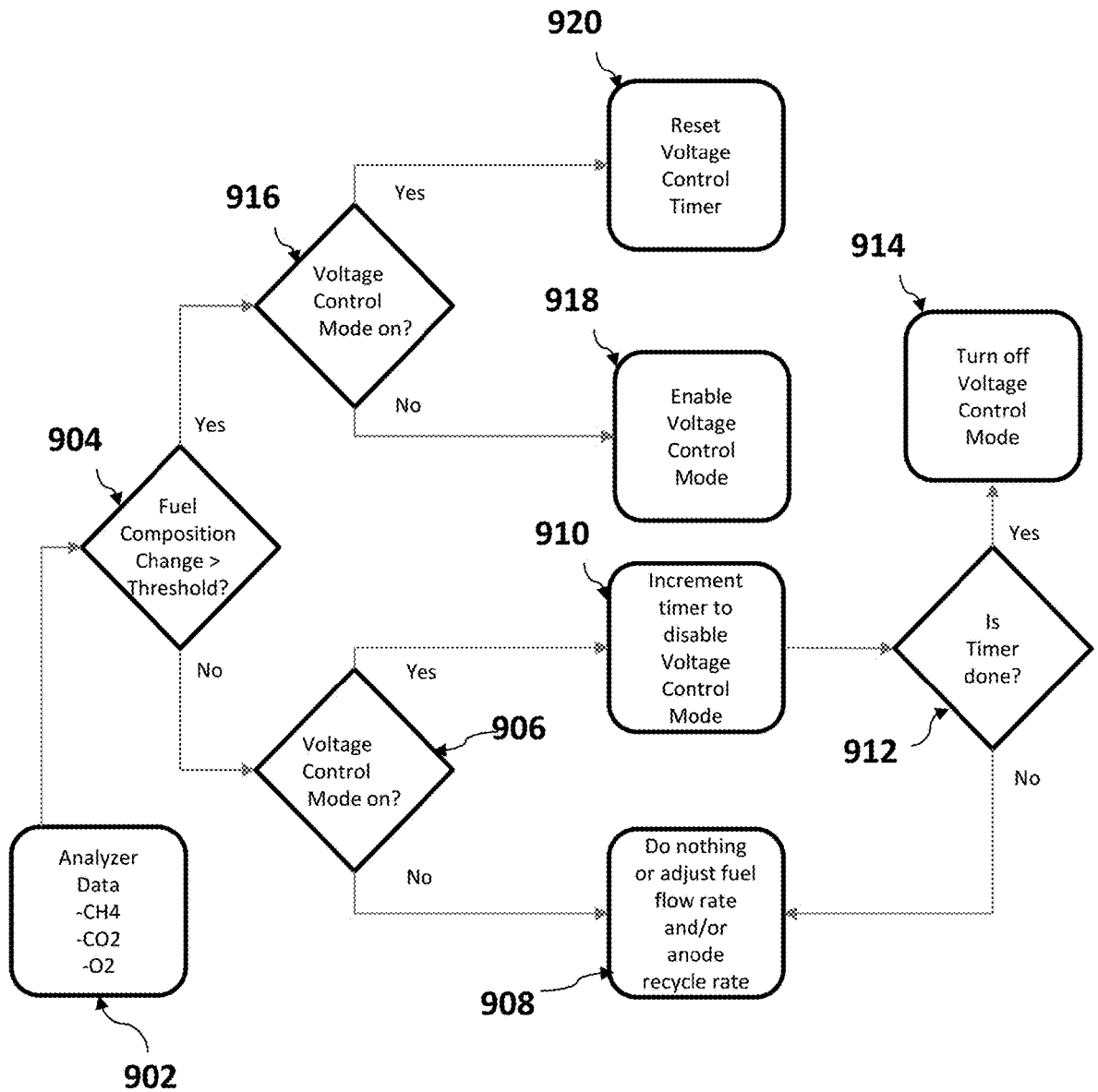
FIG. 9 is a flow chart illustrating various operations of a method of controlling a fuel cell system, according to various embodiments.

In the event of a change in fuel composition, various actions may be taken, shown in FIG. 9. Fuel composition data from the gas analyzer 220 may be transmitted by the system controller 225 to the power modules 12 in block 902. The data may be transmitted with the delay period described above (e.g., the delay period that corresponds to the time it takes the fuel to flow through the fuel processing module 16). In block 904, the system controller 225 determines if the fuel composition change is greater than a predetermined threshold value. If the fuel composition change is below the threshold value (output of block 904=NO), then the fuel composition change is determined to be gradual. In this case, the system controller 225 checks if the voltage control mode (which will be described in more detail below) is on in block 906. If the voltage control mode is off (i.e., output of block 906=NO), then in block 908, the system controller 225 may take no action or it may use fuel composition data to adjust the perception of fuel availability by the power modules 12, depending on the nature of the data from the gas analyzer 220. Based on the perception of fuel availability within the input fuel gas stream, the fuel flow rate may then be adjusted so that a predetermined amount of usable fuel may be supplied to power modules 12. The anode recycle blower 212 may also be adjusted to maintain a constant oxygen to carbon ratio within fuel cells of the fuel cell stack 102. If the voltage control mode is on (i.e., output of block 906=YES), then the system controller 225 may increment (i.e., advance) the internal timer to which counts down to disabling of the voltage control mode. In block 912, the system controller 225 determines whether the timer is done. If the timer is done (output of block 912=YES), then the system controller 225 turns off the voltage control mode. If the timer is not done (output of block 914=NO), then system controller 225 may return to block 908 and take one or more actions or no actions to keep the power module 12 output voltage at a predetermined voltage value or in a predetermined voltage range.

Alternatively, if the system controller 225 determines in block 904 that the fuel composition change is greater than the predetermined threshold value (output of block 904=YES), then the fuel composition change is determined to be sudden and/or drastic. In one embodiment, the drastic/sudden change is defined as based on an absolute value. In one embodiment, the drastic/sudden change can be configured to have a mutually exclusive threshold for both a drastic/sudden increase/decrease in lower heating value and a mutually exclusive threshold for both a drastic/sudden increase/decrease in fuel availability. Alternatively, the drastic/sudden change may have the same threshold for the drastic/sudden increase/decrease in the lower heating value and the fuel availability.

The system controller 225 may monitor changes in fuel composition and may characterize such changes in terms of a lower heating value or lower value of fuel availability. The system controller 225 may further determine that the composition change that exceeds the threshold has occurred for a time that is greater than a predetermined time interval. The system controller 225 may also determine a moving average of fuel composition and may determine a moving average of time rate of change of fuel composition. The system controller 225 may further determine that one or both of the moving average of fuel composition and/or the moving average of time rate of change of fuel composition has exceeded a predetermined threshold. The system controller 225 may further be configured to determine a frequency and amplitude of composition changes and may determine that one or both of the frequency and amplitude of composition changes has exceeded a respective threshold.

Upon detection of one or more events that exceed a respective threshold, as described above, the system controller 225 may determine if the voltage control mode is on in block 916. If the voltage control mode is not on (output of block 916=NO), then the system controller sends a signal to a controller associated with a power conditioning module 18 to enter the voltage control mode in block 918. If the voltage control mode is on (output of block 916=YES), then the system controller resets the internal timer to keep the voltage control mode on for another predetermined period in block 920. As described in greater detail below, the voltage control mode acts to control the power modules 12 to generate a fixed predetermined output voltage. The voltage control mode command may be sent for a predetermined time interval in block 918. The timer may be programmatically adjusted in real time based on a tunable function of the magnitude of the change and flow rate in order to minimize a time during which the system is controlled according to the voltage control mode. The timer may be reset every time the system controller 225 detects one or more events that exceed a respective threshold in block 920. The system controller 225 may further be configured to keep the system in voltage control mode until such time that it is determined that voltage stability has been achieved by periodically returning to block 904. The system may then exit voltage control mode in block 914 but may return to voltage control mode when certain composition changes are once again detected in block 904, as described above.

In the event of unknown compositional changes, bad data, or lack of data from the gas analyzer 220, the system may be operated in the voltage control mode as a primary control mode. During operation in the voltage control mode, fuel composition data determined by the system controller 225 may continue to be sent to the power modules 12. The system controller 225 may be configured to send a signal to the power conditional module 18 to enter the voltage control mode only when it is safe to do so (e.g., when the power module 12 is not performing an action that would affect voltages and prevent good control).

The voltage control mode for the power module 12 may include performing a closed loop control method (e.g., by the system controller 225) to increase or decrease a fuel flow rate and/or to increase or decrease the anode exhaust recycle rate by the anode recycle blower 212 to thereby increase or decrease the voltage generated by the power module 12 (e.g., by the fuel cell stack 102) to maintain a predetermined target voltage. The closed loop control method may consider the voltage generated by the power module 12 to be an input variable and the fuel utilization of the power module 12 to be an output variable. The closed loop control method may be configured to control the voltage to a set point voltage value generated based on the history of the power module 12 and/or based on empirical or first principles models of the power module 12. The output voltage generated by the power module 12 is monitored by the system controller 225. If the detected output voltage is outside a predetermined value or range, then the voltage control mode is entered and the power module 12 is controlled such that its output voltage equals the set point voltage or desired range of voltage values. The closed loop control method may adjust the fuel inputted into the system and/or output of the anode recycle blower 212 to adjust the system fuel utilization. If fuel utilization hits preset bounds of allowed change, then the voltage may be maintained by controlling current generated by the power module. Changes in the fuel utilization may be correlated with the approximate fuel compositional changes. Such approximate fuel compositional changes may then can be used to control the anode recycle blower 212 output to increase or decrease the amount of anode exhaust recycling to maintain an estimated oxygen to carbon ratio.

The power modules 12 may enter the voltage control mode upon receipt of a command from the power conditioning module 18, which may in turn receive a command from the system controller 225. Various conditions may trigger entry into the voltage control mode based on detected composition changes, as described above. Entry into the voltage control mode may further be governed based on various protocols. For example, according to a liquid propane detection protocol, the power modules 12 may enter voltage control when the fuel gas is determined to contain propane (e.g., when peak shaving of natural gas begins).

Figure 10:
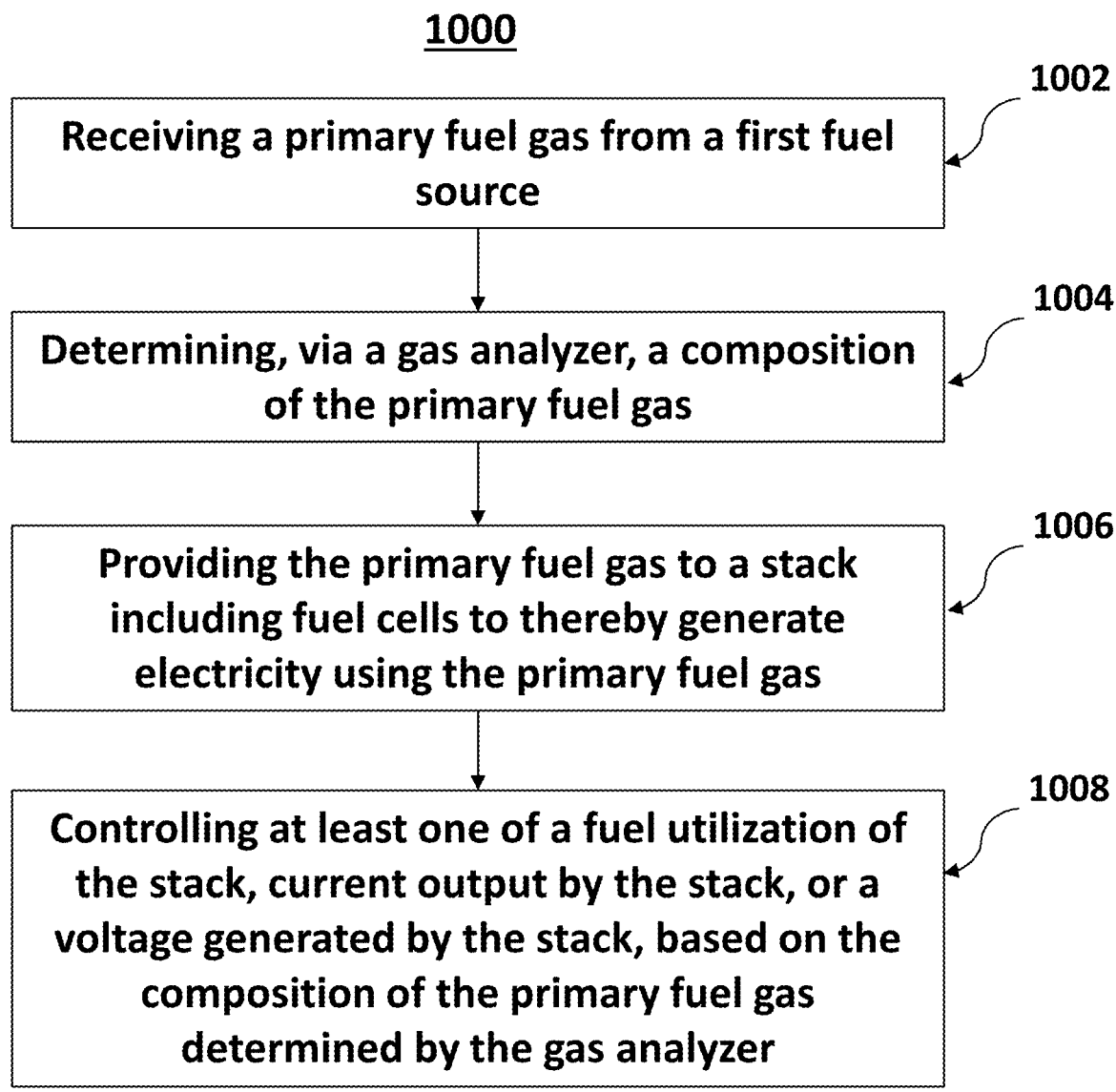
FIG. 10 is a flow chart illustrating various operations of a method of controlling a fuel cell system, according to various embodiments.

FIG. 10 is a flow chart illustrating various operations of a method 1000 of controlling a fuel cell system, according to various embodiments. In a first operation 1002, the method 1000 may include receiving a primary fuel gas from a first fuel source, and in a second operation 1004, the method 1000 may including determining a composition of the primary fuel gas using a gas analyzer 220. In operation 1006, the method 1000 may include providing the primary fuel gas to a stack 102 including fuel cells that generate electricity using the primary fuel gas. In operation 1008, the method 1000 may include controlling at least one of a fuel utilization of the stack 102, current output by the stack 102, or a voltage generated by the stack 102, based on the composition of the primary fuel gas determined by the gas analyzer 220. As described above, various controllers (e.g., system controller 225) may be used to control fuel utilization of the stack 102, current output by the stack 102, or voltage generated by the stack 102.

In various embodiments, a composition of the primary fuel gas may be determined based partially on first composition data generated by the gas analyzer 220 and based partially on second composition data received from another data source. The method 1000 may further include determining a fuel availability based on the composition of the primary fuel gas determined by the gas analyzer 220 and adjusting a fuel flow rate, based on the determined fuel availability, to maintain a predetermined rate at which usable fuel is supplied to the stack 102. The method 1000 may further include determining that the fuel availability is below a fuel availability threshold. As such, the method 1000 may include controlling the system to generate a blended fuel gas having an increased fuel availability. The blended gas may be generated by combing the primary fuel gas with a secondary fuel gas received from a second fuel source. The secondary fuel gas may be chosen to have a known fuel availability that is higher than the fuel availability threshold. The blended fuel gas may then be provided to the fuel cell stack 102. The primary fuel may comprise biofuel, marine fuel or other heavy hydrocarbon fuel. The secondary fuel may comprise methane or natural gas. The method 1000 may further include controlling generation of the blended fuel in various ways. For example, a closed loop control method may be used to automatically blend an amount of the secondary fuel gas with the primary fuel gas to thereby generate the blended fuel gas having a predetermined minimum fuel availability or minimum lower heating value. Alternatively, a closed loop control method may be used to control a flow rate of the primary fuel gas, via a fuel control valve and flow meter (not shown), to thereby a maintain a predetermined flow setpoint of the primary fuel gas. Alternatively, an open loop control method may be used to set a first constant flow rate of the primary fuel gas and to set a second constant flow rate of the secondary fuel gas. The method 1000 may further include automatically blending the primary fuel gas and secondary fuel gas having a fixed pressure when a pressure of the primary gas decreases to below the fixed pressure.

In further embodiments, the method 1000 may include using a closed loop control method to control the voltage generated by the stack. For example, the system controller 225 may measure the voltage generated by the stack and may increase or decrease a fuel flow rate to thereby increase or decrease the voltage generated by the stack to maintain a predetermined target voltage. The system controller 225 may further control the amount of anode exhaust gas from the stack 102 mixed with the primary fuel gas to generate a mixed fuel gas, which may then be supplied to the stack 102. The system controller 225 may further control a rate at which the anode exhaust gas from the stack is mixed with the primary fuel gas to thereby control the fuel utilization and an oxygen/carbon ratio of fuel supplied to the stack. The system controller 225 may further be configured to determine an estimated change in composition of the primary fuel gas based on changes in the voltage generated by the stack. The system controller 225 may be further configured to control the rate at which the anode exhaust gas is mixed with the primary fuel based on the estimated change in composition. The method 1000 may further include determining that the voltage is within a predetermined range of voltage values and controlling the current generated by the stack to thereby control the voltage generated by the stack to maintain a predetermined target voltage if the fuel utilization is outside the predetermined range.

Figure 11:
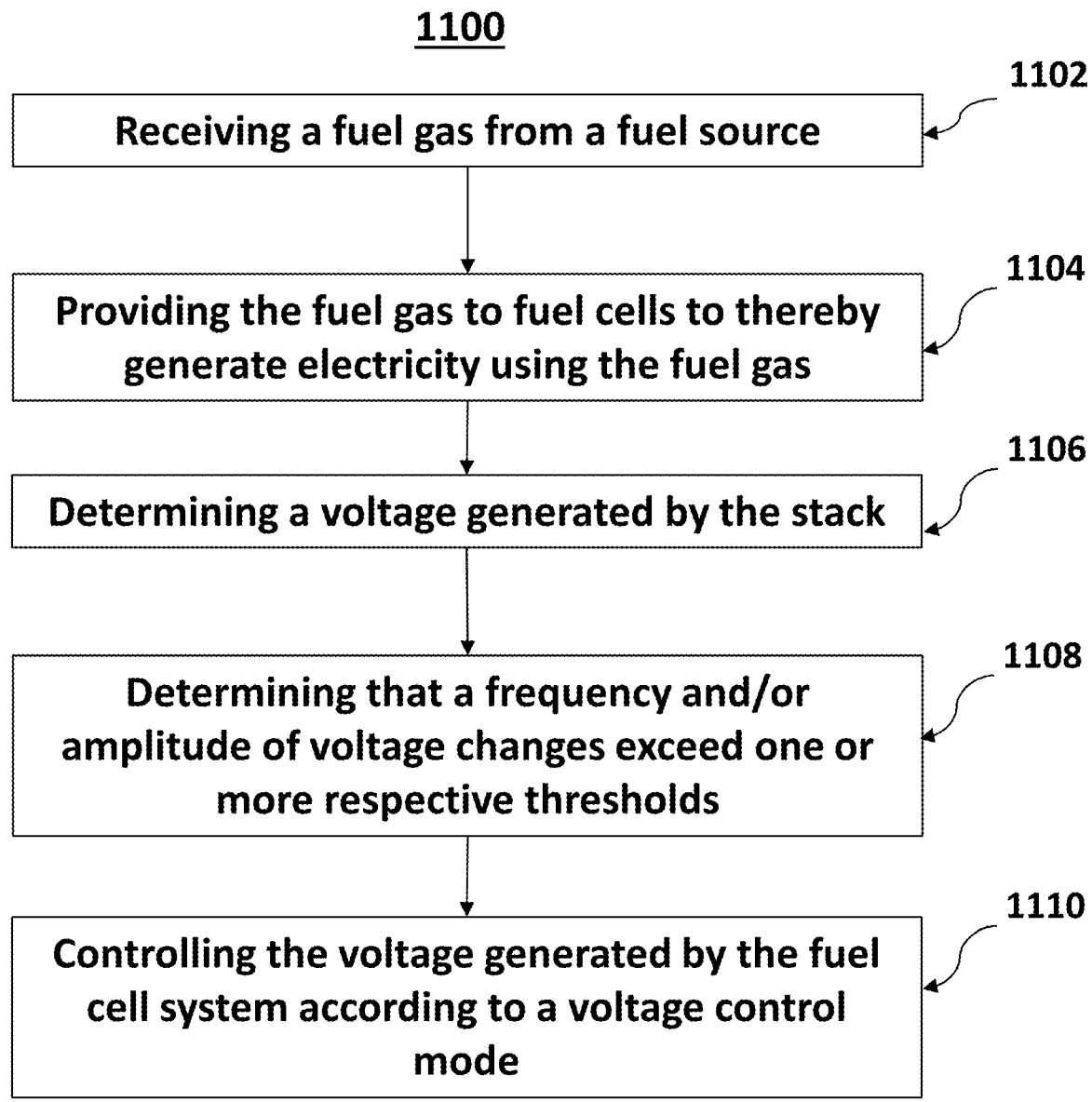
FIG. 11 is a flow chart illustrating various operations in a method 1100 of controlling a fuel cell system, according to various embodiments.

FIG. 11 is a flow chart illustrating various operations in a method 1100 of controlling a fuel cell system, according to various embodiments. In a first operation 1102, the method 1100 may include receiving a fuel gas from a fuel source, and in a second operation 1104, the method 1100 may include providing the fuel gas to a stack 102 including fuel cells that generate electricity using the fuel gas. In operation 1106, the method 1100 may include determining a voltage generated by the stack 102. In operation 1108, the method 1100 may include determining that a frequency and/or amplitude of voltage changes exceed one or more respective thresholds. In operation 1110, the method 1100 may include controlling the voltage generated by the fuel cell system according to a voltage control mode. As described above, the voltage control mode may include performing a closed loop control method to increase or decrease a fuel flow rate to thereby increase or decrease the voltage generated by the stack to thereby maintain a predetermined target voltage.

In further embodiments, the method 1100 may include controlling the voltage generated by the fuel cell system according to the voltage control mode for a predetermined time after determining that frequency and/or amplitude of voltage changes exceed the one or more respective thresholds. At other times, when the voltage control mode is not performed, the method 1100 may include controlling the fuel cell system according to a fuel composition control mode. The fuel composition control mode may include determining a composition of the fuel gas, determining a fuel availability based on the composition of the primary fuel gas determined by the gas analyzer, and adjusting a fuel flow rate, based on determined fuel availability, to maintain a predetermined rate at which usable fuel is supplied to the stack In some embodiments, the voltage target may be complex and models or historian based target generation may need manual intervention. This problem may be solved by customization of the voltage target for each power module that the voltage control mode is controlling in order to account for non-captured variations in expected voltage. The user may manually set the voltage setpoint for the voltage control mode voltage target. This setpoint may either be in the form of a complete bypass of the historian or model-based estimation of the target voltage as described above, and/or an offset of the historian or model-based estimation of the target voltage.

In some embodiments, the voltage control mode may need direct intervention from the user to trigger on events not captured by code conditions. In response, the user may force the voltage control mode on at their discretion. The user can trigger voltage control mode based on external information that the site level, system 10 level and/or power module 12 level systems do not control for.

In some embodiments, the anode recycle flow may not adjust appropriately if it does not know the fuel composition. This problem may be solved by having the anode recycle subsystem (such as the recycle blower control algorithm) in the power module 12 controller utilize fuel composition data to adapt its oxygen to carbon ratio (O:C) target during the voltage control mode. When the fuel composition data is not available, the power module 12 performance metrics based on empirical, first principles and/or historical data may be used in order to infer all or part of the fuel composition, lower heating value and/or amount of fuel available.

In some embodiments, the system 10 may need to react based on uncontrollable fuel composition or composition dangerous to the health of the system. In the event of detection of uncontrollable or dangerous fuel compositions to the health of the fuel cell system 10, the site level controller may take appropriate corrective action.

Dangerous compositions include a composition with dangerous levels of $H_2S$ beyond a set threshold that may be defined based on power module 12 health specifications, and/or a composition with levels of siloxane species beyond a set threshold that may be defined based on power module 12 health specifications.

Uncontrollable compositions include:
(i) A rapid change in composition at the inlet of the site at a faster rate than can be addressed at the power module 12 level with or without voltage control mode as defined by a threshold that may be set based on empirical data;
(ii) rapid and constant fluctuations of composition at a rate faster than a threshold that may be set based on empirical data;
(iii) fluctuations of composition with an amplitude beyond the threshold that may be set based on empirical data; and/or
(iv) a composition with lower heating value (LHV) or fuel availability too low for the power modules to effectively sustain the desired current or power output as defined by one or a combination of empirical, first principles or historical models.

On detection of one or multiple of the above-mentioned conditions, the controller may take one of the following actions:
(a) Initiate a warning alarm at the site level to notify of an unsupported composition;
(b) Initiate a ramp alarm at the site level to lower the current setpoint or desired power output of the all systems. The specific setpoint may vary depending on the condition and associated severity. This may latch or may recover on condition recovery;
(c) Initiate a normal stop alarm at the site level to stop the systems in a safe manner. This may be latch only and may require user intervention to recover; and/or
(d) Initiate a power module 12 stop alarm at the site level to stop the systems immediately to protect against the condition.

Depending on the severity of the detected issue, the controller may change the action accordingly. The controller may also latch any alarms or automatically clear and recover based on the severity and the specific condition detected. The actions are:

In some embodiments, the gas analyzer data can be very noisy or erratic. This problem may be solved by passing the fuel composition data received from a gas analyzer through a low pass or bandpass filter. This may be combined with the delay mentioned above.

In some embodiments, the gas analyzer data may have valuable spikes and changes that need to be utilized. This problem may be solved by allowing certain data to bypass the filter if certain conditions are met. These conditions may include amplitude of change and rate of change of the fuel composition, lower heating value or fuel availability.

In some embodiments, the gas analyzer may have an offset in reading that cannot be addressed immediately via formal calibration and span preventing proper usage. This problem may be solved by having the user add manual offsets to each channel data from a gas analyzer to digitally address improper calibration, span or zero before the data is transmitted to and utilized by the system 10 or power module 12.

The preceding description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:
1. A fuel cell system comprising:
a fuel inlet configured to receive a primary fuel gas from a first fuel source;
a gas analyzer configured to determine a composition of the primary fuel gas received by the fuel inlet;
a stack comprising fuel cells configured to generate electricity using the primary fuel gas received from the first fuel source and a secondary fuel gas received from a second fuel source with a known fuel availability, the primary fuel gas and the secondary fuel gas forming a blended fuel gas for the stack; and
a controller configured to:
control at least one of a fuel utilization of the stack, current generated by the stack, or a voltage generated by the stack, based on the composition of the primary fuel gas determined by the gas analyzer and the secondary fuel gas with the known fuel availability, by controlling a flow rate of the secondary fuel gas to satisfy a minimum blended fuel gas availability threshold;

mix anode exhaust gas from the stack with the blended fuel gas to generate a mixed fuel gas;

supply the mixed fuel gas to the stack; and control a rate at which the anode exhaust gas from the stack is mixed with the primary fuel gas to thereby control an oxygen/carbon ratio of the mixed fuel gas supplied to the stack such that the oxygen/carbon ratio is maintained to have a predetermined target value.

2. The fuel cell system of claim 1, wherein the controller is further configured to determine the composition of the primary fuel gas using a first composition data generated by the gas analyzer and using a second composition data different from the first composition data received from a different data source than the gas analyzer.

3. The fuel cell system of claim 1, wherein the controller is further configured:

to determine a primary fuel gas availability based on the composition of the primary fuel gas determined by the gas analyzer, wherein the primary fuel gas availability is determined based on a number of carbon and hydrogen atoms relative to a number of oxygen atoms in the composition of the primary fuel gas; and to adjust the blended fuel gas flow rate, based on the determined primary fuel gas availability, to thereby maintain a predetermined rate at which the blended fuel gas is supplied to the stack.

4. The fuel cell system of claim 1, wherein the controller is further configured to use a closed loop control method to control the voltage generated by the stack by performing operations comprising:

measuring the voltage generated by the stack; and increasing or decreasing the blended fuel gas flow rate to thereby increase or decrease the voltage generated by the stack to maintain a predetermined target voltage.

5. The fuel cell system of claim 1, wherein the controller is further configured to control the voltage generated by the stack by performing operations comprising:

determining that a fuel utilization value of the stack is outside a predetermined range; and controlling the current generated by the stack to thereby control the voltage generated by the stack to maintain a predetermined target voltage.

6. The fuel cell system of claim 1, further comprising:

a fuel control valve; and a fuel flow meter, wherein the controller is further configured to control generation of the blended fuel gas by using a closed loop control method to control a flow rate of the primary fuel gas, via the fuel control valve and the flow meter, to thereby a maintain a predetermined flow setpoint of the primary fuel gas.

7. The fuel cell system of claim 1, wherein the controller is further configured to control generation of the blended fuel gas by using a closed loop control method to blend an amount of the secondary fuel gas with the primary fuel gas to thereby generate the blended fuel gas having a predetermined minimum blended fuel gas availability or minimum lower heating value.

8. The fuel cell system of claim 1, wherein the controller is further configured to control generation of the blended fuel gas by using an open loop control method to set a first constant flow rate of the primary fuel gas and to set a second constant flow rate of the secondary fuel gas.

9. The fuel cell system of claim 1, wherein the primary fuel gas comprises biogas, and the secondary fuel gas comprises natural gas from a pipeline.

10. A fuel cell system comprising:

a fuel inlet configured to receive a primary fuel gas from a first fuel source;

a gas analyzer configured to determine a composition of the primary fuel gas received by the fuel inlet;

a stack comprising fuel cells configured to generate electricity using the primary fuel gas received from the first fuel source; and a controller configured to control at least one of a fuel utilization of the stack, current generated by the stack, or a voltage generated by the stack, based on the composition of the primary fuel gas determined by the gas analyzer, wherein the controller is further configured:

to determine a primary fuel gas availability based on the composition of the primary fuel gas determined by the gas analyzer;

to determine that the fuel availability of the primary fuel gas is below a minimum primary fuel gas availability threshold;

to control the fuel cell system to generate a blended fuel gas having an increased availability by blending the primary fuel gas with a secondary fuel gas received from a second fuel source, the secondary fuel gas having a known fuel gas availability that is higher than the minimum primary fuel gas availability threshold;

to adjust a blended fuel gas flow rate, based on the determined primary fuel gas availability, to thereby maintain a predetermined rate at which the blended fuel gas is supplied to the stack; and to supply the blended fuel gas to the stack.

11. A fuel cell system comprising:

a fuel inlet configured to receive a primary fuel gas from a first fuel source;

a gas analyzer configured to determine a composition of the primary fuel gas received by the fuel inlet;

a stack comprising fuel cells configured to generate electricity using the primary fuel gas received from the first fuel source and a secondary fuel gas received from a second fuel source with a known fuel availability, the primary fuel gas and the secondary fuel gas forming a blended fuel gas for the stack;

a controller configured to control at least one of a fuel utilization of the stack, current generated by the stack, or a voltage generated by the stack, based on the composition of the primary fuel gas determined by the gas analyzer and the secondary fuel gas with the known fuel availability, by controlling a flow rate of the secondary fuel gas to satisfy a minimum blended fuel gas availability threshold;

a fuel control valve; and a fuel flow meter, wherein the controller is further configured to control generation of the blended fuel gas by performing at least one of the following operations:

using a closed loop control method to blend an amount of the secondary fuel gas with the primary fuel gas to thereby generate the blended fuel gas having a predetermined minimum blended fuel gas availability or minimum lower heating value;

using a closed loop control method to control a flow rate of the primary fuel gas, via the fuel control valve and the flow meter, to thereby a maintain a predetermined flow setpoint of the primary fuel gas; or using an open loop control method to set a first constant flow rate of the primary fuel gas and to set a second constant flow rate of the secondary fuel gas.

* * * * *